United States Patent
Kitamura et al.

(10) Patent No.: US 8,963,439 B2
(45) Date of Patent: Feb. 24, 2015

(54) POWER SUPPLY FOR LIGHTING AND LUMINAIRE

(75) Inventors: Noriyuki Kitamura, Kanagawa-ken (JP); Hirokazu Otake, Kanagawa-ken (JP); Yuji Takahashi, Kanagawa-ken (JP); Toshio Tsuji, Kanagawa-ken (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 200 days.

(21) Appl. No.: 13/608,246

(22) Filed: Sep. 10, 2012

(65) Prior Publication Data

US 2013/0113387 A1    May 9, 2013

(30) Foreign Application Priority Data

| Nov. 4, 2011  | (JP) | ................. | 2011-242165 |
| Mar. 14, 2012 | (JP) | ................. | 2012-057775 |
| Mar. 14, 2012 | (JP) | ................. | 2012-057776 |

(51) Int. Cl.
*H05B 37/00* (2006.01)
*H05B 33/08* (2006.01)

(52) U.S. Cl.
CPC ........... *H05B 33/0815* (2013.01); *Y02B 20/346* (2013.01)
USPC ......................................... 315/224; 315/301

(58) Field of Classification Search
USPC ................. 315/224, 225, 294, 297, 301, 307
See application file for complete search history.

(56) References Cited

U.S. PATENT DOCUMENTS

| 8,222,832 B2* | 7/2012 | Zheng et al. .................. 315/291 |
| 2007/0182338 A1 | 8/2007 | Shteynberg et al. |
| 2007/0182347 A1 | 8/2007 | Shteynberg et al. |
| 2008/0224629 A1 | 9/2008 | Melanson |
| 2010/0090604 A1 | 4/2010 | Maruyama et al. |
| 2011/0121754 A1 | 5/2011 | Shteynberg et al. |

FOREIGN PATENT DOCUMENTS

| JP | 2011-119237 A | 6/2011 |
| WO | 2010/011971 A1 | 1/2010 |
| WO | 2011/008635 A1 | 1/2011 |

OTHER PUBLICATIONS

Extended EP Search Report mailed Mar. 5, 2013, EP Appln. 12183432.9.
EP Communication (Office Action) mailed May 16, 2014, EP Appln. 12183432.9.

* cited by examiner

*Primary Examiner* — Daniel D Chang
(74) *Attorney, Agent, or Firm* — Banner & Witcoff, Ltd.

(57) ABSTRACT

According to one embodiment, a power supply for lighting includes an output element. The output element is connected between a power supply and a lighting load, and configured to be capable of being switched to a switching operation repeating an ON state and an OFF state and an ON continuation operation continuing the ON state.

20 Claims, 11 Drawing Sheets

POWER SUPPLY FOR LIGHTING AND LUMINAIRE

CROSS-REFERENCE TO RELATED APPLICATIONS

This application is based upon and claims the benefit, of priority from the prior Japanese Patent Application No. 2011-242165, filed on Nov. 4, 2011, Japanese Patent Application No. 2012-057775, filed on Mar. 14, 2012 and Japanese Patent Application No. 2012-057776, filed on Mar. 14, 2012; the entire contents of which are incorporated herein by reference.

FIELD

Embodiments described herein relate generally to a power supply for lighting and a luminaire.

BACKGROUND

In recent years, in luminaires, more and more illumination light sources such as an incandescent lamp and a fluorescent lamp are replaced with energy-saving and long-life light sources such as a light-emitting diode (LED). Further, new illumination light sources such as an EL (Electro-Luminescence) and an organic light-emitting diode (OLED) are developed. Optical outputs of these illumination light sources depend on a current value. Therefore, if lighting is turned on, a power-supply circuit that supplies a constant current is necessary. If the lighting is dimmed, an electric current to be supplied is controlled.

A two-wire dimmer is configured to control a phase in which a triac is turned on. The two-wire dimmer is spread as a dimmer for an incandescent lamp. Therefore, it is desirable that an illumination light source such as an LED can also be dimmed by the dimmer. As a power supply that is highly efficient and suitable for power saving and a reduction in size, a switching power-supply such as a DC-DC converter is known.

However, the dimmer is configured to operate while being connected in series to a filament of the incandescent lamp used as a load. If the switching power-supply is connected, it is likely that load impedance changes and the dimmer malfunctions.

If an optical output is reduced, in a switching operation, in a state in which an illumination light source is slightly lit, a switching regulator is operating or is stopped. Therefore, flickering tends to occurs. Even if current feedback is performed, it is difficult to detect a micro current during the slight lighting. The illumination light source tends to be unstably lit.

DETAILED DESCRIPTION

Figure 1:
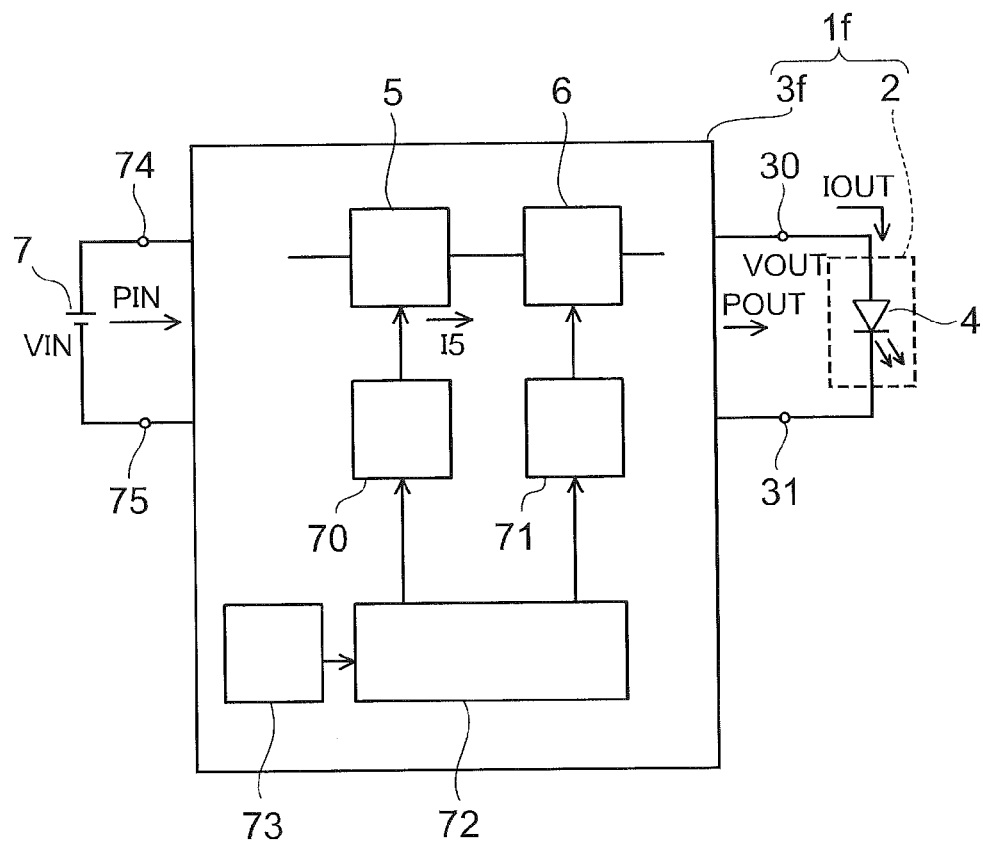
FIG. 1 is a block diagram of a luminal re including a power supply for lighting according to a first embodiment.

In general, according to one embodiment, a power supply for lighting includes an output element. The output element is connected between a power supply and a lighting load and configured to be capable of being switched, to a switching operation repeating an ON state and an OFF state and an ON continuation operation continuing the ON state.

In general, according to another embodiment, a power supply for lighting includes an output element and a constant current element. The output element is connected between a power supply and a lighting load and configured to perform a switching operation repeating an ON state and an OFF state if a potential difference between the power supply and the lighting load is relatively large and continue the ON state if the potential difference between the power supply and the lighting load, is relatively small. The constant current element is connected in series to the output element and configured to limit an electric current flowing to the output element.

In general, according to still another embodiment, a power supply for lighting includes an output element, a constant current element, and a light turn-off circuit. The output element, is connected, between a power supply and a lighting load, and configured to perform a switching operation repeating an ON state and an OFF state if a predetermined amount, which is at least any one of a power difference, a potential difference, and a current difference between the power supply and the lighting load, is relatively large and continue the ON state if the predetermined amount between the power supply and the lighting load is relatively small. The constant current element is connected in series to the output element and configured to limit an electric current flowing to the output, element. The light, turn-off circuit is connected between the power supply and the lighting load and configured to turn off the constant current element if the predetermined amount, is equal to or smaller than a specified value.

Embodiments are explained in detail below with reference to the accompanying drawings. In the specification and the figures, components same as those already explained with reference to the figures are denoted by the same reference numerals and signs and detailed explanation of the components is omitted as appropriate. In the specification, a "dimming degree" refers to a ratio of an optical output during dimming to an optical output, during full lighting. The dimming degree of 100% corresponds to full lighting and the dimming degree of 0% corresponds to an optical output during light off.

First Embodiment

FIG. 1 is a block diagram of a luminaire including a power supply for lighting according to a first embodiment.

As shown in FIG. 1, a luminaire 1f includes a lighting load 2 and a power supply for lighting 3f that supplies electric power to the lighting load 2.

The lighting load 2 includes an illumination light, source 4 such as an LED. The lighting load 2 is supplied with output power POUT (an output voltage VOUT and an output current IOUT) from the power supply for lighting 3f and is turned on. The lighting load 2 can be dimmed by changing the output power POUT. For example, the lighting load 2 can be dimmed by changing at least one of the output voltage VOUT and the output current IOUT. Respective values of the output power POUT, the output voltage VOUT, and the output, current IOUT are specified according to the illumination light source 4.

Figure 2:
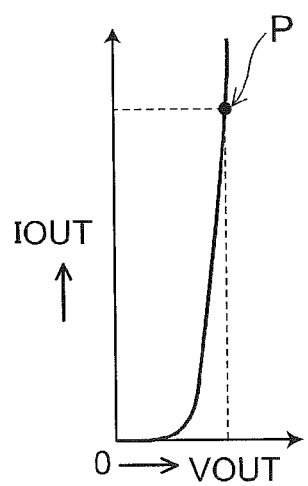
FIG. 2 is a characteristic chart, for explaining a relation between an output voltage VOUT and an output current IOUT supplied to a lighting load.

FIG. 2 is a characteristic chart for explaining a relation between the output voltage VOUT and the output current IOUT supplied to the lighting load.

In FIG. 2, a characteristic of a lighting load including an illumination light source having small operation resistance during lighting such as an LED is illustrated.

If the output voltage VOUT is lower than a predetermined voltage, an electric current does not flow to the lighting load 2. The lighting load 2 is off. If the output voltage VOUT is equal to or higher than the predetermined voltage, an electric current flows to the lighting load 2. The lighting load 2 is turned on.

For example, if the illumination light source 4 is an LED, the predetermined voltage is a forward direction voltage of the LED and is set according to the illumination light source 4. The illumination light, source 4 has a low operation resistance during lighting. For example, even if the output current IOUT increases near a rated operating point P, the output voltage VOUT changes little. Therefore, the lighting load 2 having the characteristic shown in FIG. 2 can be dimmed by changing the output current IOUT to control an optical output of the illumination light source 4. If the output voltage VOUT drops below the predetermined voltage, the illumination light source 4 is turned off and the output current IOUT stops flowing. Therefore, for example, if the output voltage VOUT is smoothed by a capacitor and output, the value of the output voltage VOUT is kept, at a value equal to or higher than the predetermined voltage.

It is possible to control and dim an optical output of the illumination light source 4 by changing, for example, the output voltage VOUT supplied to the illumination light source 4.

In this way, it is possible to control and dim the optical output of the illumination light source 4 by changing the output power POUT supplied to the lighting load 2. In the following explanation, changing an output refers to changing at least any one of the output voltage VOUT, the output current IOUT, and the output power POUT. In the following explanation, a control amount controlled to perform dimming is at least any one of the output voltage VOUT, the output current IOUT, and the output power POUT.

The power supply for lighting 3f includes an output element 5, a constant current, element 6, a first driving circuit 70 that drives the output element 5, a second driving circuit. 71 that drives the constant, current element 6, a control circuit. 72 that controls the output element 5 and the constant current, element 6 via the first and second driving circuits 70 and 71, and an interface circuit 73. The power supply for lighting 3f converts input power PIN input to input terminals 74 and 75 and outputs the input power PIN between a high-potential output terminal 30 and a low-potential output terminal 31 as the output power POUT.

The output element 5 is connected between the lighting load 2 and a power supply 7. The output element 5 is configured to be capable of being switched to a switching operation repeating an ON state and an OFF state and an ON continuation operation continuing the ON state.

Figure 3A:
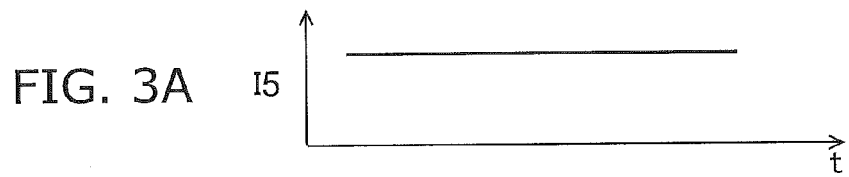
FIGS. 3A to 3D are waveform charts of current waveforms of an output element.
Figure 3B:
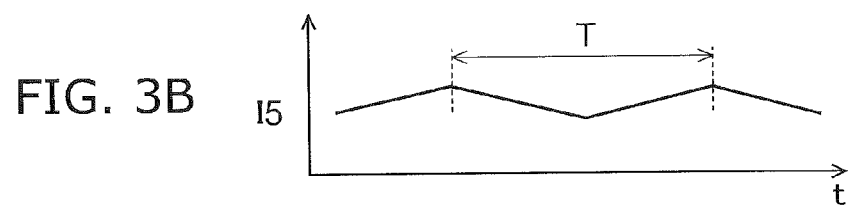
Figure 3C:
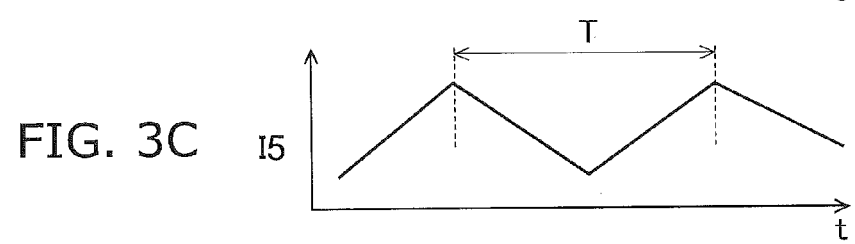
Figure 3D:
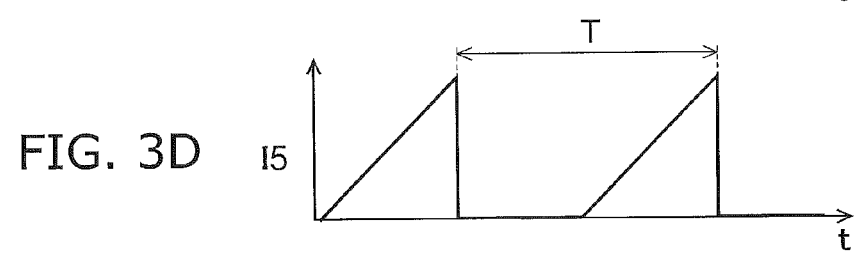

FIGS. 3A to 3D are waveform charts of current waveforms of the output element. FIG. 3A is a waveform chart of a current waveform, of the ON continuation operation, FIGS. 3B and 3C are waveform, charts of current waveforms of an operation in which an electric current wobbles while the ON state is continued. FIG. 3D is a waveform chart of a current waveform, of the switching operation. In FIGS. 3A to 3D, time t is plotted on the abscissa and waveforms of an electric current I5 of the output element 5 are shown.

As shown in FIG. 3A, in the ON continuation operation of the output element 5, a substantially constant direct current limited, by the constant current element 6 flows to the output element 5. In a state in which the output, element 5 outputs a constant direct current, the power supply for lighting 3f performs an operation like the operation of a series regulator.

As shown in FIGS. 3B and 3C, in the operation in which an electric current wobbles while the output element 5 continues the ON state, the output element 5 changes to, for example, a state in which the output element 5 is imperfectly oscillating. However, in this operation, the output element 5 does not change to the OFF state and continues the ON state. A peak value of the wobbling electric current of the output element 5 is a value limited by a constant current value of the constant current element 6. An oscillation period T of the output element 5 changes according to a variation range of the electric current. In FIG. 3C, a variation range of the electric current I5 of the output element 5 is larger than that in the case of FIG. 3B.

As shown in FIG. 3D, in the switching operation of the output element 5, the output element 5 oscillates. At this point, the power supply for lighting 3f operates as a switching power supply.

The constant current element 6 is connected in series to the output element 5. The constant current element 6 limits a peak value of the electric current I5 of the output element 5. The output element 5 and the constant current element 6 are, for example, field effect transistors (FETs) and, for example, high electron mobility transistors (HEMTs).

The first driving circuit 70 drives the output, element 5. The first driving circuit 70 controls, for example, the potential of a control terminal of the output element 5 and switches the operation of the output element 5. The second driving circuit 71 drives the constant current element 6. The second driving circuit 71 controls, for example, the potential of a control terminal of the constant, current element 6 and controls a constant current value.

The control circuit 72 controls the output element 5 via the first driving circuit 70 and controls the constant current element 6 via the second driving circuit 71. The control circuit 72 controls driving conditions of the output element 5 and the constant current element 6, switches the output element 5 to the switching operation or the ON continuation operation, and controls a current value of the output element 5.

If a control signal for setting an output to the lighting load 2 relatively large is input, the control circuit 72 controls the constant current element 6 to increase the constant current, value of the constant, current, element 6 and controls the output element 5 to cause the output element 5 to perform the switching operation. If a control signal for setting the output to the lighting load 2 relatively small is input, the control circuit 72 controls the constant current element 6 to reduce the constant current value of the constant current element 6 and controls the output element 5 to cause the output element 5 to perform the ON continuation operation.

The interface circuit 73 receives a dimming signal for controlling an optical output of the lighting load 2 and outputs the dimming signal to the control circuit 72 as a control signal for controlling the output power POUT. The dimming signal is, for example, a phase control signal, a PWM dimming signal, a DALI (Digital Addressable Lighting Interface) signal, a wireless or wired communication signal of a LAN or the like, or an output signal of a sensor.

If the dimming signal is, for example, the phase control signal, for example, the interface circuit 73 can compare an alternating-current voltage phase-controlled by a dimmer 8 with a predetermined value, detect a conduction period and an interruption period of the dimmer 8, and generate a control signal.

If the dimming signal is, for example, the PWM signal, for example, the interface circuit 73 can generate a control signal on the basis of a duty ratio.

If the dimming signal is, for example, the DALI signal, for example, the interface circuit 73 includes a microcomputer such as a logic circuit, decodes the DALI signal, and outputs the DALI signal as a control signal.

If the dimming signal is, for example, the wireless or wired communication signal, the interface circuit 73 can include, for example, a receiving circuit that demodulates a communication signal and a microcomputer or a logic circuit that decodes a demodulated signal and outputs the signal as a control signal.

If the dimming signal is, for example, the output signal of the sensor, the interface circuit 73 can include, for example, a receiving element that receives the output signal of the sensor and an analyzing circuit that analyzes a signal received by the receiving element. The sensor is provided on the outside of the power supply for lighting 3f. As the sensor, for example, a far infrared sensor, a near infrared sensor, an ultrasonic sensor, a proximity sensor, an acceleration sensor, a gravity sensor, a sound sensor (a sound pressure sensor), or a color sensor (a waveform sensor) can be provided.

The interface circuit 73 may generate the control signal on the basis of the input power PIN or the input power PIN and the output power POUT without using the dimming signal input from the outside. For example, the interface circuit 73 can control the output power POUT according to a change in the input power PIN supplied from the power supply 7 to the power supply for lighting 3f. In a power supply obtained by rectifying an alternating-current power supply phase-controlled by the dimmer 8, the interface circuit 73 can change the input power PIN using the dimmer 8. The interface circuit 73 can control an output according to a change in a power supply voltage VIN of the power supply 7.

In this case, if the input power PIN or a power difference between the input power PIN and the output power POUT is relatively large, the interface circuit 73 generates, as the control signal, a control signal for setting an output to the lighting load 2 relatively large. If the input power PIN or the power difference between the input power PIN and the output power POUT is relatively small, the interface circuit 73 generates a control signal for setting the output to the lighting load 2 relatively small.

The power supply 7 only has to be capable of feeding a direct current. The power supply 7 is, for example, a battery, a power supply including solar power generation and a secondary battery, a USB power supply, or a LAN power supply and is, for example, a power supply obtained by rectifying an alternating-current power supply such as a commercial power supply. The power supply obtained by rectifying the alternating-current power supply is, for example, a full-wave rectified power supply and is, for example, a power supply smoothed by a smoothing capacitor.

Figure 4:
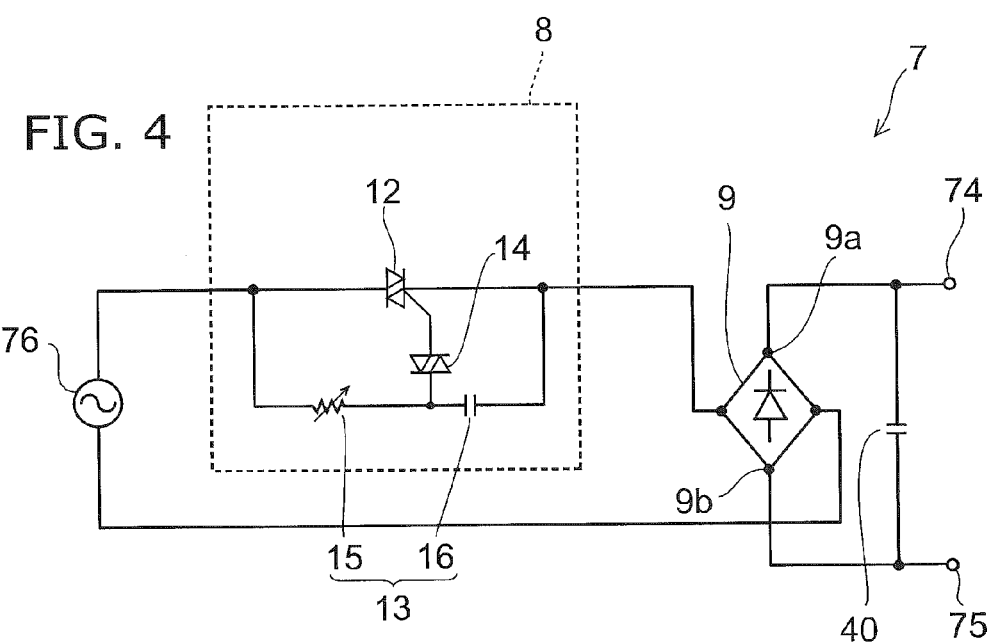
FIG. 4 is a circuit diagram of a direct-current power supply including a dimmer.

FIG. 4 is a circuit diagram of a direct-current power supply including a dimmer.

As shown in FIG. 4, the power supply 7 includes the dimmer 8, a rectifying circuit 9, and the smoothing capacitor 40.

The dimmer 8 is a two-wire phase control dimmer. The dimmer 8 is connected to an alternating-current power supply 76 and inserted into one of a pair of power supply lines in series. In this way, the dimmer 8 may be inserted into the pair of power supply lines in series.

The dimmer 8 includes a triac 12 inserted into a power supply line in series, a phase circuit 13 connected in parallel to the triac 12, and a DIAC 14 connected between a gate of the triac 12 and the phase circuit 13.

The triac 12 is usually in an OFF state. If a pulse signal is input, to the gate, the triac 12 is turned on. The triac 12 can feed an electric current in both directions at the time when the alternating-current power supply voltage VIN has positive polarity and when the alternating-current power supply voltage VIN has negative polarity.

The phase circuit 13 includes a variable resistor 15 and a capacitor 16. The phase circuit 13 generates a phase-delayed voltage across both ends of the capacitor 16. If the resistance of the variable resistor 15 is changed, a time constant changes and a delay time changes.

The DIAC 14 generates a pulse voltage if a voltage charged in a capacitor of the phase circuit 13 exceeds a fixed value and turns on the triac 12.

The dimmer 8 can adjust, by changing the time constant of the phase circuit 13 and controlling timing when the DIAC 14 generates a pulse, timing when the triac 12 is turned on.

The rectifying circuit 9 receives an alternating-current power supply voltage via the dimmer 8 and outputs a direct-current voltage. The rectifying circuit 9 includes a diode bridge. The rectifying circuit 9 outputs a direct-current voltage that changes according to a dimming degree by the dimmer 8. The rectifying circuit 9 only has to be capable of rectifying an alternating-current voltage input from the dimmer 8 and may have other configurations. A capacitor that reduces noise caused in the power supply for lighting 3f is connected to an input side of the rectifying circuit 9.

The smoothing capacitor 40 is connected between a high-potential terminal 9a and a low-potential terminal 9b of the rectifying circuit 9. The smoothing capacitor 40 smoothes the direct-current voltage rectified by the rectifying circuit 9.

In a configuration illustrated in the figure, a direct-current power supply is connected as the power supply 7 in the power supply for lighting 3f. However, a configuration may be adopted in which the rectifying circuit 9 and the smoothing capacitor 40 are included in the power supply for lighting 3f and electric power is supplied to the power supply for lighting 3f from the alternating-current power supply 76.

The switching power supply performs the switching operation repeating the ON state in which the resistance of the output element 5 is low and the OFF state in which an electric current does not flow. Therefore, the switching power supply is a low-power consumption and high-efficiency power supply.

In the embodiment, the switching power supply performs the switching operation if the output power POUT is equal to or larger than a predetermined value (predetermined power) and performs an operation like an operation of a series regulator if the output power POUT is smaller than the predetermined power. If the output power POUT is large, a product of a potential difference $\Delta V$ between an input and an output and an electric current is large and a loss increases if the switching power supply performs the operation of the series regulator. Therefore, it is suitable for a reduction in power consumption to perform, the switching operation if the output power POUT is large. If the output power POUT is small, since a loss is small, there is no problem in operating as the series regulator.

In the embodiment, if the output power POUT is smaller than the predetermined value (the predetermined power), an electric current wobbles while the output element 5 continues the ON state without changing to the OFF state. The output element 5 turns on the lighting load 2 with an average of the current (FIGS. 3B and 3C). If the output power POUT is smaller, the output element 5 outputs a direct current to the lighting load 2 and turns on the lighting load 2 while continuing the ON state (FIG. 3A). As a result, in the embodiment, it is possible to continuously change an output current to zero. It is possible to smoothly turn off the lighting load 2 in the luminaire 1f.

Therefore, in the embodiment, it is possible to continuously change, according to the output power POUT, the output power POUT from a maximum during the switching operation of the output element 5 to a minimum in outputting the direct current while continuing the ON state of the output element 5. It is possible to continuously dim the lighting load 2 in the luminaire 1f in a range of 0 to 100%.

In an operation illustrated in FIGS. 3B and 3C, an electric current, wobbles while the output element 5 continues the ON state without changing to the OFF state and, if the output power POUT increases, a variation range of the electric current increases. However, the output element 5 may perform the switching operation repeating the ON state and the OFF state and oscillate if the output power POUT is equal to or larger than the predetermined value (FIG. 3D) and perform an operation continuing the ON state and outputting a direct current if the output power POUT is smaller than the predetermined value (FIG. 3A). In other words, the output element 5 does not have to perform the operation in which the electric current wobbles while the output element 5 continues the ON state without changing to the OFF state (FIGS. 3B and 3C).

Second Embodiment

Figure 5A:
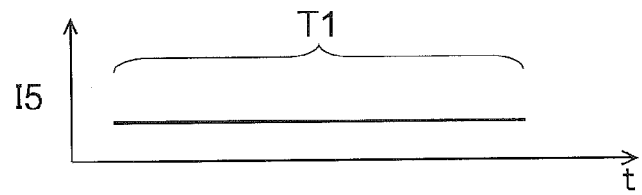
FIGS. 5A to 5D are waveform charts of current waveforms of an output element in a second embodiment.
Figure 5B:
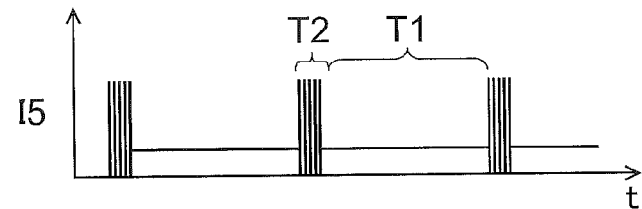
Figure 5C:
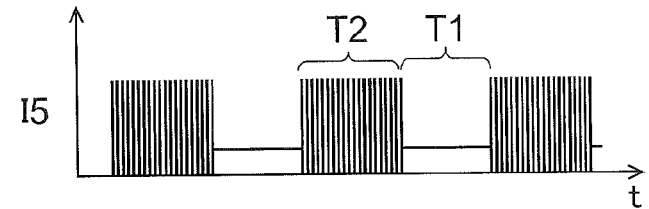
Figure 5D:
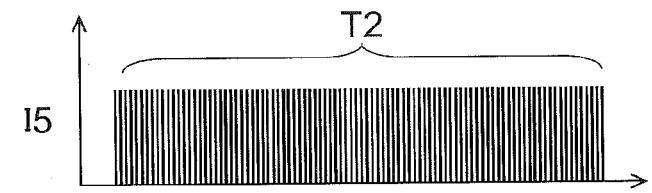

FIGS. 5A to 5D are waveform, charts of current waveforms of an output element, in a second embodiment, FIG. 5A is a waveform chart of a current waveform of an ON continuation operation. FIGS. 5B and 5C are waveform charts of current waveforms of an operation switching to the ON continuation operation and a switching operation. FIG. 5D is a waveform chart of a current, waveform of the switching operation. In FIGS. 5A to 5D, time t is plotted on the abscissa and waveforms of the electric current I5 of the output element 5 are shown.

The second embodiment is different from the first embodiment in the operation of the output element 5.

As shown in FIG. 5A, if the output power POUT is equal to or smaller than a relatively-small first output, the entire period of the time t is a first period T1 in which the output element 5 performs the ON continuation operation. A substantially constant direct current limited by the constant current element 6 flows to the output element 5. In a state in which the output, element 5 outputs the constant direct, current, the power supply for lighting 3f performs an operation like an operation of a series regular.

As shown in FIGS. 5B and 5C, if the output power POUT is higher than the first output, the output element 5 performs an operation repeating the first period T1 in which the output element 5 performs the ON continuation operation and a second period T2 in which the output element 5 performs the switching operation. A peak value of a wobbling electric current of the output element 5 is a value limited by a constant current value of the constant current element 6. The first period T1 in which the output element 5 performs the ON continuation operation and the second period T2 in which the output element 5 performs the switching operation change according to the output power POUT. For example, in FIG. 5C, the output power POUT is larger than that shown in FIG. 5B. The second period T2 is longer than the first period T1.

As shown in FIG. 5D, if the output power POUT is equal to or larger than a relatively-large second output, the entire period of the time t is the second period T2 in which the output, element 5 performs the switching operation. At this point, the power supply for lighting 3f operates as a switching power supply. The second output is an output value larger than the first output.

As explained above, the control circuit 72 switches the output element 5 to the ON continuation operation in the first period T1 and to the switching operation in the second period T2 and continuously changes average power. As a result, it is possible to continuously change the output, power POUT between a maximum and a minimum. It is possible to continuously dim the lighting load 2 in the luminaire 1f in a range of 0 to 100%.

In the embodiment, it is possible to obtain effects same as the effects in the first embodiment.

Third Embodiment

A third embodiment is explained.

Figure 6:
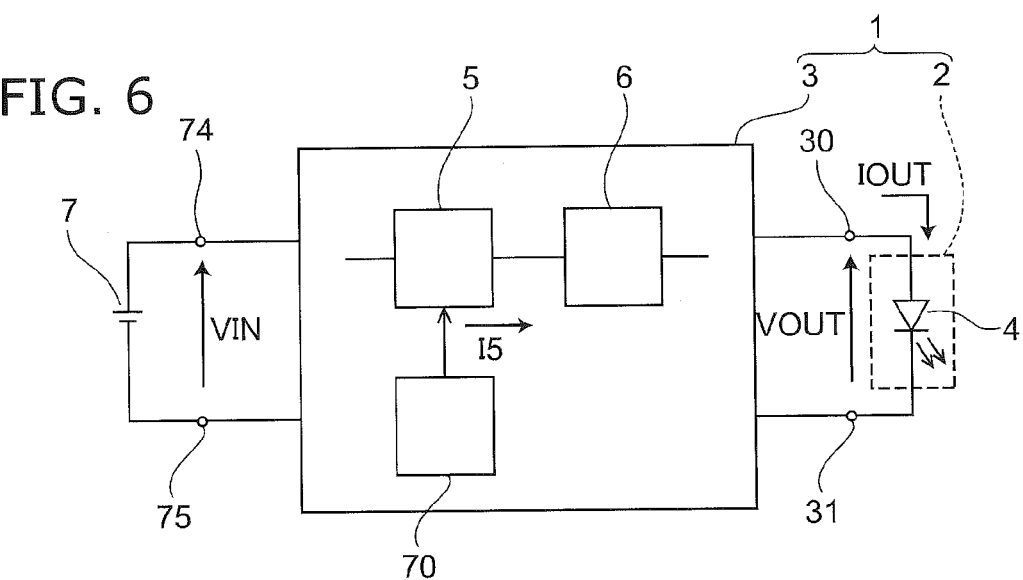
FIG. 6 is a block diagram of a luminaire including a power supply for lighting according to a third embodiment.

FIG. 6 is a block diagram of a luminaire including a power supply for lighting according to the third embodiment.

As shown in FIG. 6, a luminaire 1 includes the lighting load 2 and a power supply for lighting 3 that supplies electric power to the lighting load 2. The luminaire 1 including the power supply for lighting 3 according to the third embodiment is different from the luminaire 1f according to the first embodiment in the configuration of the power supply for lighting 3f. The lighting load 2 is the same as the lighting load 2 in the first, embodiment.

The power supply for lighting 3 includes the output element 5, the constant current element 6 that is connected in series to the output element 5 and limits an electric current flowing to the output element 5, and the first driving circuit 70 that drives the output element 5.

The output element 5 is connected between the lighting load 2 and the power supply 7. The output element 5 performs a switching operation repeating an ON state and an OFF state if, under a condition that the output element 5 is caused to operate at a constant current, a predetermined amount, which is at least, any one of a power difference, a potential difference, and a current difference between the power supply 7 and the lighting load 2, is relatively large, i.e., equal to or larger than a first value and maintains the ON state if the predetermined value is relatively small, i.e., smaller than the first value.

The predetermined amount is a difference amount between an input, amount, of at least, any one of an input voltage (the power supply voltage VIN), an input, current, and the input, power PIN supplied from the power supply 7 and a control amount of at least any one of the output voltage VOUT, the output current IOUT, and the output power POUT output to the lighting load 2.

For example, if the control amount is the output voltage VOUT, the predetermined amount is a potential difference $\Delta V$ between the power supply voltage VIN and the output voltage VOUT. In this case, the output element 5 performs the switching operation repeating the ON state and the OFF state if the potential difference ΔV (=VIN−VOUT) between the power supply voltage VIN and the output voltage VOUT output to the lighting load 2 is relatively large (equal to or larger than the first value) and performs an ON continuation operation maintaining the ON state if the potential difference ΔV between the power supply 7 and the lighting load 2 is relatively small (smaller than the first value).

For example, if the control amount is the output current IOUT, the predetermined amount is a current difference ΔI between the output current IOUT and the input current. In this case, the output element 5 performs the switching operation repeating the ON state and the OFF state if the current difference ΔI between the input current supplied from the power supply 7 and the output current TOUT output to the lighting load 2 is relatively large (equal to or larger than the first value) and performs the ON continuation operation maintaining the ON state if the current difference ΔI between the power supply 7 and the lighting load 2 is relatively small (smaller than the first value).

For example, if the control amount is the output power POUT, the predetermined amount is a power difference ΔP between the input power PIN and the output power POUT. The power difference ΔP means a loss of the power supply for lighting 3. In this case, under a condition that the output, element 5 is caused to operate with a constant current, the output element 5 performs the switching operation repeating the ON state and the OFF state if the power difference ΔP (=PIN−POUT) between the input power PIN supplied from the power supply 7 and the output power POUT output to the lighting load 2 is relatively large (equal to or larger than the first value) and performs the ON continuation operation maintaining the ON state if the power difference ΔP between the power supply 7 and the lighting load 2 is relatively small (smaller than the first value).

The predetermined amount may be at least any one of the input voltage (the power supply voltage VIN), the input current, and the input power PIN supplied from the power supply 7 and the output voltage VOUT, the output current IOUT, and the output power POUT output to the lighting load 2. The predetermined amount may be the power consumption of the output element 5.

For example, the output element 5 in the embodiment performs the switching operation repeating the ON state and the OFF state if the potential difference ΔV (=VIN−VOUT) between the power supply voltage VIN of the power supply 7 and the output voltage VOUT output to the lighting load 2 is relatively large (equal to or larger than the first value) and maintains the ON state if the potential difference ΔV between the power supply 7 and the lighting load 2 is relatively small (smaller than the first value).

The first driving circuit 70 supplies potential to the control terminal of the output element 5 and controls the output element 5 to the ON state or the OFF state.

The operation of the output element in the embodiment, performed when, for example, the predetermined amount is the potential difference ΔV between the power supply 7 and the lighting load 2 is explained with reference to FIGS. 3A to 3D again.

Waveforms of the electric current I5 of the output element 5 obtained when the potential difference ΔV (the predetermined amount) between the power supply 7 and the lighting load 2 increases in the order of FIGS. 3A to 3D are schematically shown.

As shown in FIG. 3A, if the potential difference ΔV is relatively small, the output element 5 continues the ON state (the ON continuation operation). A substantially constant direct current limited by the constant current element 6 flows. In a state in which the output element 5 outputs a constant direct current, the power supply for lighting 3 performs an operation like the operation of a series regulator.

As shown in FIG. 3B, if the potential difference ΔV increases, an electric current wobbles while the output element 5 continues the ON state (the ON continuation operation). As shown in FIG. 3C, if the potential difference ΔV further increases, a variation range of the electric current of the output element 5 increases according to the potential difference ΔV.

As explained above, if the potential difference ΔV increases, the output element 5 changes to, for example, a state in which, the output element 5 is imperfectly oscillating. The electric current of the output element 5 wobbles. However, if the potential difference ΔV is smaller than the predetermined value, the output element 5 does not change to the OFF state and continues the ON state. A peak value of the wobbling electric current of the output element 5 is a value limited by a constant current value of the constant current element 6. The oscillation period T of the output element 5 changes according to the variation range of the electric current.

As shown in FIG. 3D, if the potential difference ΔV is equal to or larger than the predetermined value (the first value), the output element 5 performs the switching operation repeating the ON state and the OFF state and oscillates. At this point, the power supply for lighting 3 operates as a switching power supply.

The switching power supply performs the switching operation repeating the ON state in which the resistance of the output element 5 is low and the OFF state in which an electric current, does not flow. Therefore, the switching power supply is a low-power consumption and high-efficiency power supply. In the embodiment, the switching power supply performs the switching operation if the potential difference ΔV is larger than the predetermined value and performs the operation like the operation of the series regulator if the potential difference ΔV is small. If the potential difference ΔV is large, a product of the potential difference ΔV and an electric current is large and a loss increases if the switching power supply performs the operation of the series regulator. Therefore, it is suitable for a reduction in power consumption to perform the switching operation if the potential difference ΔV is large. If the potential difference ΔV is small, since a loss is small, there is no problem in operating as the series regulator.

In the embodiment, if the potential difference ΔV is smaller than the predetermined value (the first value), an electric current wobbles while the output element 5 continues the ON state without changing to the OFF state. The output element 5 turns on the lighting load 2 with an average of the current (FIGS. 3B and 3C). If the potential difference ΔV is smaller, i.e., if the potential difference ΔV is equal to or smaller than a second value smaller than the first value, the output element 5 outputs a direct current to the lighting load 2 and turns on the lighting load 2 while continuing the ON state (FIG. 3A). As a result, in the embodiment, it is possible to continuously change the output current to zero. It is possible to smoothly turn off the lighting load 2 in the luminaire 1.

Therefore, in the embodiment, it is possible to continuously change, according to the potential difference ΔV, the output current IOUT from a maximum during the switching operation of the output element 5 to a minimum in outputting the direct current while continuing the ON state of the output element 5. It is possible to continuously dim the lighting load 2 in the luminaire 1 in a range of 0 to 100%.

In an operation illustrated in FIGS. 3A to 3C, an electric current, wobbles while the output element 5 continues the ON state without changing to the OFF state and, if the potential difference ΔV increases to be equal to or larger than the second value, a variation range of the electric current increases (FIGS. 3B and 3C). However, the output element 5 may perform the switching operation repeating the ON state and the OFF state and oscillate if the potential difference ΔV is equal to or larger than the predetermined, value (the first value) (FIG. 3D) and perform an operation continuing the ON state and outputting a direct current if the potential difference ΔV is equal to or smaller than the second value smaller than the predetermined value (the first value) (FIG. 3A). In other words, the output element 5 does not have to perform the operation in which the electric current wobbles while the output element 5 continues the ON state without changing to the OFF state (FIGS. 3B and 3C).

If the output element 5 is in the OFF state, the output current IOUT may be fed by a rectifying element or the like.

As explained above, in the embodiment, the output element oscillates and outputs an oscillating current if the potential difference between the power supply and the lighting load is relatively large and stops the oscillation and outputs a direct current if the potential difference is relatively small. As a result, it is possible to expand a variable range of the output current. Further, it is possible to expand a dimming range of the luminaire.

Fourth Embodiment

Figure 7:
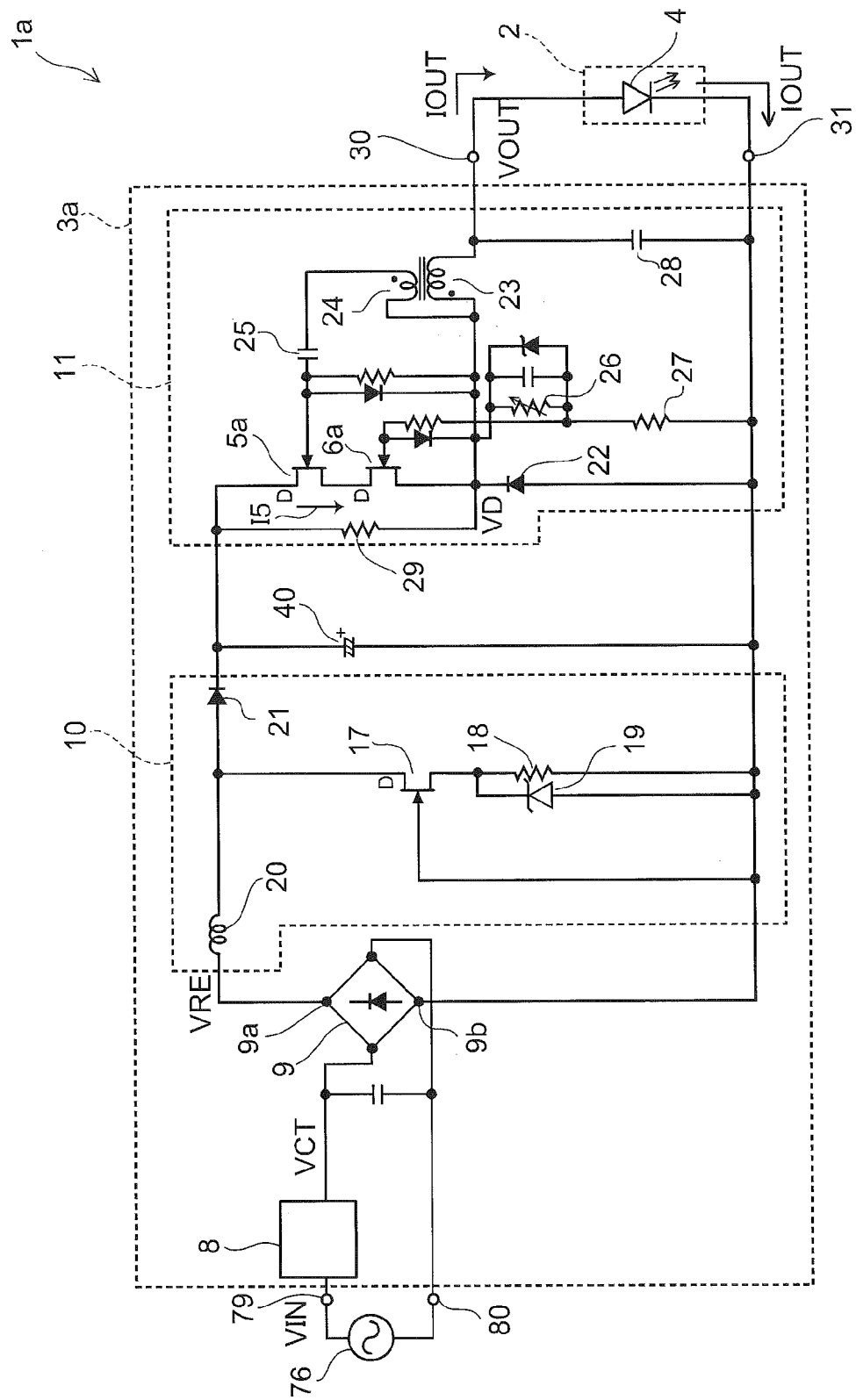
FIG. 7 is a circuit diagram of a luminaire including a power supply for lighting according to a fourth embodiment.

FIG. 7 is a circuit diagram of a luminaire including a power supply for lighting according to a fourth embodiment.

As shown in FIG. 7, the fourth embodiment is different from the third embodiment in that the dimmer 8, the rectifying circuit 9, and a constant current circuit 10 are added to the power supply for lighting 3 and that the configuration of a DC-DC converter 11 including an output element and a constant current, element, is illustrated. A luminaire 1a includes the lighting load 2 and a power supply for lighting 3a. The lighting load 2 is the same as the lighting load 2 according to the first embodiment.

The power supply for lighting 3a includes the dimmer 8 that phase-controls the alternating-current power supply 76, the rectifying circuit 9 that converts a phase-controlled alternating-current voltage to a direct current, the constant current circuit 10 that feeds a constant current necessary for the dimmer 8 to perform phase-control, and the DC-DC converter 11 that generates the output voltage VOUT. The alternating-current power supply 76 is, for example, a commercial power supply.

The dimmer 8 is connected to the alternating-current power supply 76 and inserted into, in series, one of a pair of power supply lines for supplying the power supply voltage VIN. In this way, the dimmer 8 may be inserted into, in series, the pair of power supply lines for supplying the power supply voltage VIN. The dimmer 8 is the same as the dimmer 8 in the power supply 7 in the first embodiment.

The rectifying circuit 9 receives the alternating-current power supply voltage VIN via the dimmer 8 and outputs a direct-current voltage VRE. The rectifying circuit 9 includes a diode bridge. The rectifying circuit 9 outputs the direct-current voltage VRE that changes according to a dimming degree by the dimmer 8. The rectifying circuit 9 only has to be capable of rectifying an alternating-current voltage input from the dimmer 8 and may have other configurations. A capacitor that reduces noise caused, in the DC-DC converter 11 is connected to an input side of the rectifying circuit 9.

The constant, current circuit 10 includes a transistor 17, a resistor 18 and a Zener diode 19 that bias the transistor 17, a choke coil 20, and a diode 21.

The transistor 17 is, for example, an FET and is an element of a normally-on type. A drain of the transistor 17 is connected, to the high-potential terminal 9a of the rectifying circuit 9 via the choke coil 20. A source of the transistor 17 is connected, to the low-potential terminal 9b of the rectifying circuit 9 via the resistor 18 and the Zener diode 19 connected in parallel. A gate of the transistor 17 is connected to the low-potential terminal 9b of the rectifying circuit 9. The high-potential terminal 9a of the rectifying circuit 9 is connected to the DC-DC converter 11 via the diode 21.

The constant current circuit 10 is a circuit that feeds a constant current for causing the phase circuit 13 of the dimmer 8 to operate. An element having small impedance compared with the phase circuit 13 is connected as a load of the rectifying circuit 9. Consequently, it is possible to suppress the influence of input impedance of the DC-DC converter 11 at a post stage and cause the dimmer 8 to stably operate.

The smoothing capacitor 40 is connected between a cathode of the diode 21 of the constant current circuit 10 and the low-potential terminal 9b of the rectifying circuit 9.

The DC-DC converter 11 includes an output, element 5a, a constant current element 6a, a rectifying element 22, an inductor 23, a feedback winding (a first driving circuit) 24 that drives the output element 5a, a coupling capacitor 25, dividing resistors 26 and 27, an output capacitor 28, and a bias resistor 29.

The output element 5a and the constant current element 6a are, for example, field effect transistors (FETs), for example, high, electron mobility transistors (HEMTs), and elements of the normally-on type.

A drain of the output element 5a is connected to the high-potential terminal 9a of the rectifying circuit 9 via the constant current circuit 10. A source of the output element 5a is connected to a drain of the constant current element 6a. A gate of the output element 5a is connected to one end of the feedback winding 24 via the coupling capacitor 25.

A source of the constant current element 6a is connected, to one end of the inductor 23 and the other end of the feedback winding 24. A voltage obtained by dividing source potential of the constant current element 6a with the dividing resistors 26 and 27 is input to a gate of the constant current element 6a.

The bias resistor 29 is connected between the drain of the output element 5a and the source of the constant current element 6a. The bias resistor 29 supplies a direct-current voltage to the dividing resistors 26 and 27. As a result, a potential lower than the potential of the source is supplied to the gate of the constant current element 6a.

The inductor 23 and the feedback winding 24 are magnetically coupled in polarity in which a positive voltage is supplied to the gate of the output element 5a if an increasing electric current flows from one end to the other end of the inductor 23.

Protection diodes are respectively connected to the gate of the output, element 5a and the gate of the constant current element 6a.

The rectifying element 22 is connected between the source of the constant current element 6a and the low-potential terminal 9b of the rectifying circuit 9 with a forward direction set in the direction from the low-potential terminal 9b to the constant current element 6a.

The other end of the inductor 23 is connected to the high-potential output terminal 30. The low-potential terminal 9b of the rectifying circuit 9 is connected to the low-potential output terminal 31. The output capacitor 28 is connected between the high-potential output terminal 30 and the low-potential output terminal 31.

The lighting load 2 is connected in parallel to the output, capacitor 28 between the high-potential output terminal 30 and the low-potential output terminal 31.

The operation of the power supply for lighting 3a is explained. Since the dimmer 8, the rectifying circuit 9, and the constant current circuit 10 are already explained, the operation of the DC-DC converter 11 is mainly explained.

First, in the following explanation, the dimming degree of the dimmer 8 is set to nearly 100% and an input alternating-current voltage is substantially directly transmitted. In other words, a highest direct-current voltage is input to the DC-DC converter 11.

If the power-supply voltage YIN is supplied to the power supply for lighting 3a, since the output terminal 5a and the constant current element 6a are the elements of the normally-on type, both of the output terminal 5a and the constant current, element 6a are on. An electric current flows in the course of the output element 5a, the constant current element 6a, the inductor 23, and the output capacitor 28. The output capacitor 28 is charged. The voltage across both ends of the output capacitor 28, i.e., the voltage between the high-potential output terminal 30 and the low-potential output terminal 31 is supplied to the illumination light source 4 of the lighting load 2 as the output voltage VOUT of the power supply for lighting 3a. Since the output element 5a and the constant current element 6a are on, an inverse voltage is applied to the rectifying element 22. An electric current does not flow to the rectifying element 22.

If the output voltage VOUT reaches a predetermined voltage, the output current IOUT flows to the illumination light source 4. The illumination light source 4 is turned on. At this point, an electric current flows in the course of the output element 5a, the constant current element 6a, the inductor 23, the output capacitor 28, and the illumination light source 4. For example, if the illumination light source 4 is an LED, the predetermined voltage is a forward direction voltage of the LED and is determined according to the illumination light source 4. If the illumination light source 4 is turned off, the output current IOUT does not flow. Therefore, the output capacitor 28 keeps the value of the output voltage VOUT.

The direct-current, voltage input to the DC-DC converter 11 is sufficiently high compared with the output voltage VOUT, i.e., the potential difference ΔV between the input, and the output is sufficiently large. Therefore, the electric current flowing through the inductor 23 increases. Since the feedback winding 24 is magnetically coupled to the inductor 23, an electromotive force having polarity for setting the coupling capacitor 25 side to high potential is induced in the feedback winding 24. Therefore, potential that is positive with respect to the source of the output element 5a is supplied to the gate of the output element 5a via the coupling capacitor 25. The output, element 5a maintains an ON state.

If the electric current flowing through the constant current element 6a including the FET exceeds an upper limit, a drain-to-source voltage of the constant current element 6a suddenly rises. Therefore, a gate-to-source voltage of the output element 5a falls below a threshold voltage and the output element 5a is turned off. The upper limit is a saturated current, value of the constant, current, element 6a and is specified by potential input from the dividing resistors 26 and 27 to the gate of the constant, current element 6a. As explained above, since the gate potential of the constant current element 6a is negative with respect to the source, it is possible to limit the saturated current value to a proper value.

The inductor 23 continues to feed the electric current in the course of the rectifying element 22, the output capacitor 28 and the lighting load 2, and the inductor 23. At this point, since the inductor 23 emits energy, the electric current of the inductor 23 decreases. Therefore, an electromotive force having polarity for setting the coupling capacitor 25 side to low potential is induced in the feedback winding 24. Potential that is negative with respect to the source of the output element 5a is supplied to the gate of the output element 5a via the coupling capacitor 25. The output element 5a maintains an OFF state.

If the energy accumulated, in the inductor 23 decreases to zero, the electric current flowing through the inductor 23 decreases to zero. The direction of the electromotive force induced in the feedback winding 24 is inverted again. An electromotive force for setting the coupling capacitor 25 side to high potential is induced. Consequently, potential higher than the potential of the source is supplied to the gate of the output element 5a. The output element 5a is turned on. Consequently, the output voltage VOUT returns to the state in which the output voltage VOUT reaches the predetermined voltage.

Thereafter, the operation explained above is repeated. Consequently, the switching to ON and OFF of the output element 5a is automatically repeated. The output voltage VOUT obtained by dropping the power supply voltage VIN is supplied to the illumination light source 4. An electric current supplied to the illumination light source 4 is a constant current with an upper limit limited by the constant current element 6a. Therefore, it is possible to stably light the illumination light source 4.

If the dimming degree of the dimmer 8 is set to a value smaller than 100% and an input alternating-current voltage is phase-controlled and transmitted, i.e., if a high direct-current voltage is input to the DC-DC converter 11, the above explanation applies if the output element 5a can continue the oscillation. A value of the direct-current voltage input to the DC-DC converter 11 changes according to the dimming degree of the dimmer 8. An average of the output current IOUT can be controlled. Therefore, it is possible to dim the illumination light source 4 of the lighting load 2 according to the dimming degree.

If the dimming degree of the dimmer 8 is set to a smaller value, i.e., if the direct-current voltage input to the DC-DC converter 11 is lower, a potential difference between both ends of the inductor 23 is small even if the output element 5a is turned on. Therefore, the electric current flowing through the inductor 23 can increase. Therefore, the output element 5a does not change to the OFF state and outputs a constant direct current.

FIGS. 8A to 8H are waveform charts of main signals of the power supply for lighting.

In FIGS. 8A to 8H, measured values of the direct-current voltage VRE of the rectifying circuit 9, the output current IOUT of the power supply for lighting 3a, and the voltage VD of the rectifying element 22 measured if the dimming degree of the dimmer 8 decreases in the order of FIGS. 8A to 8H are shown.

Figure 8:
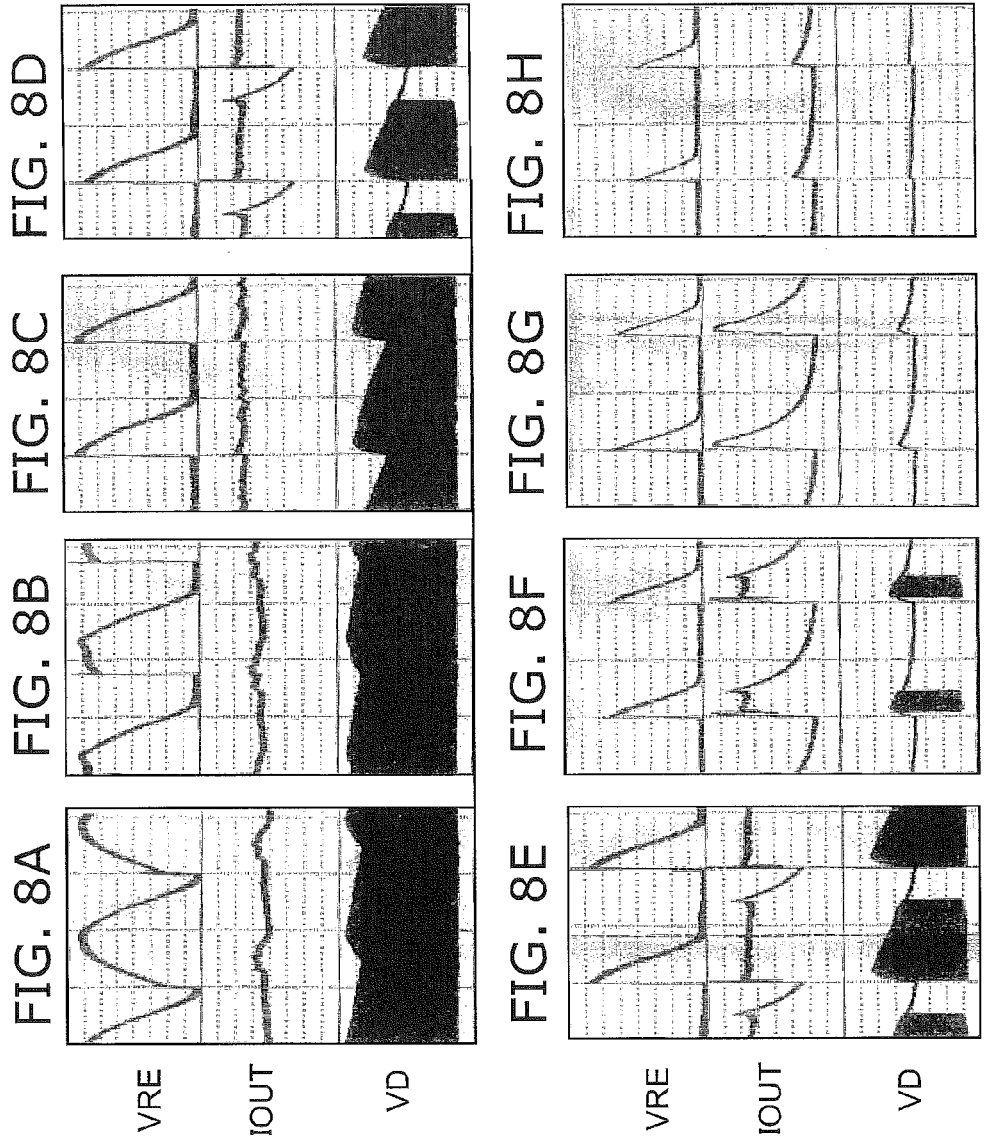
FIGS. 8A to 8H are waveform charts of main signals of the power supply for lighting.

As shown in FIGS. 8A to 8C, if the dimming degree is large, the output element 5a performs a switching operation repeating the ON state and the OFF state and oscillates. The voltage VD of the rectifying element 22 changes to an oscillating waveform. Since control corresponding to the dimming degree of the dimmer 8 is not performed, the output, current. IOUT is substantially constant.

As shown in FIGS. 8D to 8F, if the dimming degree falls, because of a ripple of a voltage input to the DC-DC converter 11, there is a period in which the output element 5a continues the ON state and stops the switching operation repeating the ON state and the OFF state. Since an average of the electric current I5 of the output element 5a changes according to the dimming degree, an average of the output current IOUT changes according to the dimming degree.

As shown in FIGS. 8G and 8H, if the dimming degree further falls, the output element 5a continues the ON state and the direct, current I5 flows. Therefore, the voltage VD of the rectifying element 22 changes to a direct-current voltage. Since a value of the direct current I5 changes according to the dimming degree, the output, current IOUT changes according to the dimming degree.

As explained above, in the embodiment, according to the dimming degree of the dimmer, the output element of the normally-on type performs the switching operation repeating the ON state and the OFF state and oscillates or continues the ON state and outputs the direct current. As a result, it is possible to continuously change an output current from a maximum to zero. Further, it is possible to smoothly turn off the lighting load in the luminaire.

Fifth Embodiment

Figure 9:
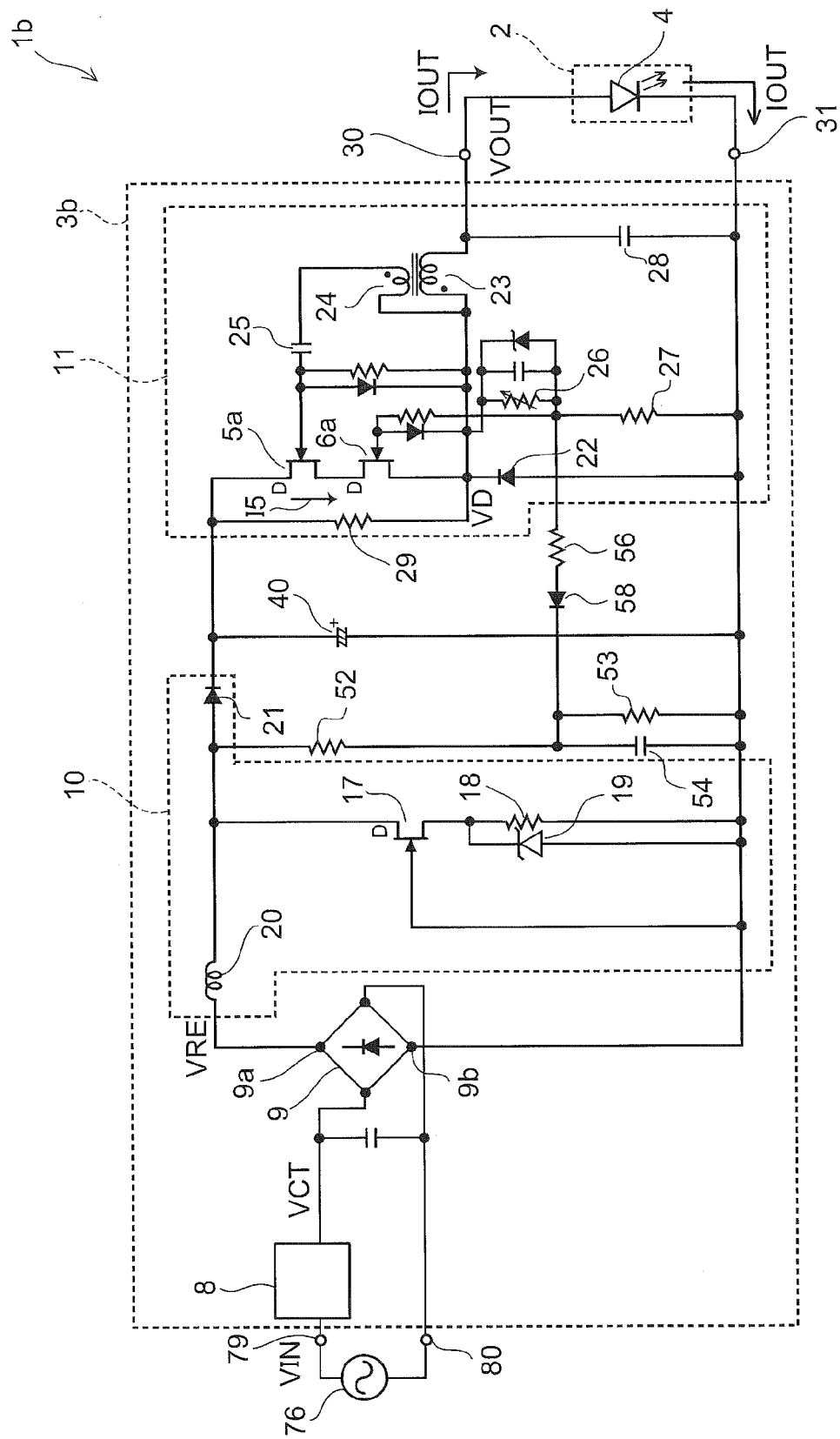
FIG. 9 is a circuit diagram of a luminaire including a power supply for lighting according to a fifth embodiment.

FIG. 9 is a circuit diagram of a luminaire including a power supply for lighting according to a fifth embodiment.

As shown in FIG. 9, the fifth embodiment is different from the fourth embodiment in a configuration for generating gate potential of the constant current, element 6a in the DC-DC converter 11. Specifically, in a power supply for lighting 3b, resistors 52, 53, and 56, a capacitor 54, and a diode 58 are added. The configurations of the dimmer 8, the rectifying circuit 9, the constant current circuit 10, and the DC-DC converter 11 are the same as the dimmer 8, the rectifying circuit 9, the constant current circuit 10, and the DC-DC converter 11 in the second embodiment.

The resistors 52 and 53 are connected in series between an anode of the diode 21 of the constant, current circuit 10 and the low-potential terminal 9b of the rectifying circuit 9. The capacitor 54 is connected in parallel to the resistor 53. The voltage of the resistor 53 is supplied to a connection point of the dividing resistors 26 and 27 via the diode 58 and the resistor 56. The resistor 52 and the capacitor 54 configure a low-pass filter or an integration circuit. A voltage obtained by smoothing the direct-current voltage VRE of the rectifying circuit 9 is generated, in the resistor 53.

The voltage of the resistor 53 changes according to the dimming degree of the dimmer 8. Therefore, it is possible to change the gate potential of the constant current element 6a according to the dimming degree.

FIGS. 10A to 10H are waveform charts of main signals of the power supply for lighting according to the fifth embodiment.

In FIGS. 10A to 10H, measured values of the direct-current voltage VRE of the rectifying circuit 9, the output current IOUT of the power supply for lighting 3b, and the voltage VD of the rectifying element 22 measured if the dimming degree of the dimmer 8 increases in the order of FIGS. 10A to 10H are shown.

Figure 10:
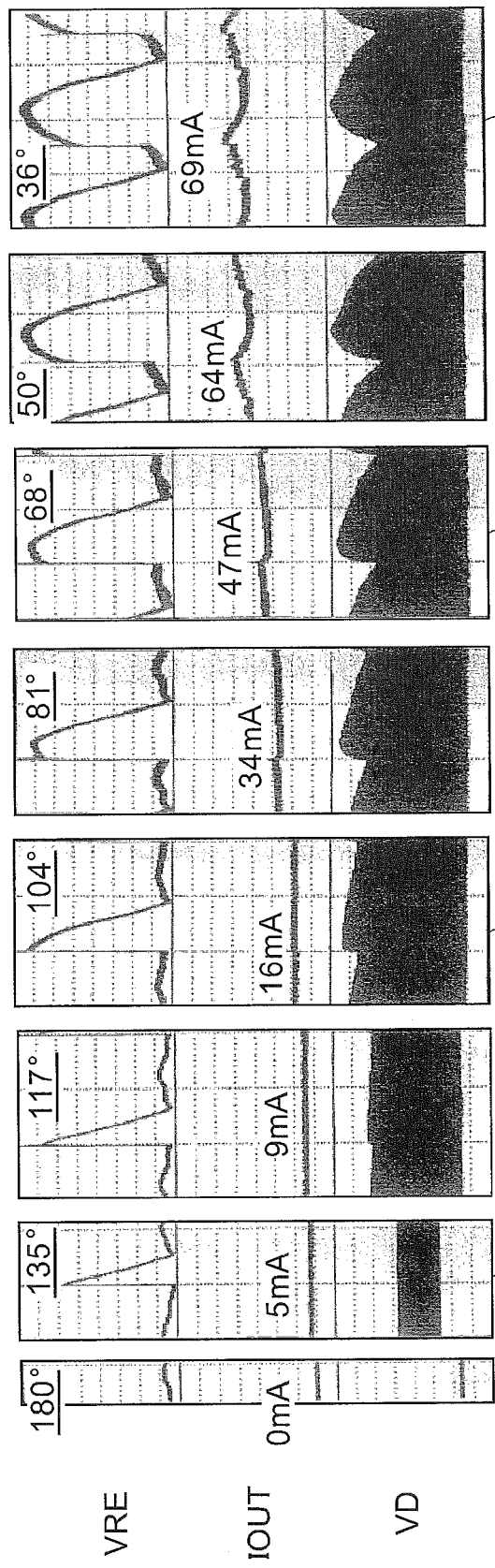
FIGS. 10A to 10H are waveform charts of main signals of the power supply for lighting.

As shown in FIG. 10A, if the dimming degree is 0%, i.e., a dimming phase angle is 180 degrees, since the direct-current voltage VRE of the rectifying circuit 9 is zero, the output current IOUT does not flow.

As shown in FIGS. 10B and 10C, if the dimming degree increases, i.e., if the dimming phase angle decreases, the direct-current voltage VRE of the rectifying circuit 9 rises, the output element 5a performs an operation in which the electric current I5 wobbles while the output element 5a continues an ON state, and the voltage VD of the rectifying element 22 wobbles. According to the dimming degree, a variation range of the electric current I5 increases and a variation range of the voltage VD of the rectifying element 22 increases. Therefore, the output current IOUT increases if the dimming degree increases. Since the output element 5a does not change to an OFF state, the voltage VD of the rectifying element 22 does not decrease to zero.

As shown in FIGS. 10D to 10H, if the dimming degree further increases, the output element 5a performs a switching operation repeating the ON state and the OFF state and oscillates. A variation range of the voltage of the rectifying element 22 increases. The voltage drops to nearly zero. The output current IOUT increases if the dimming degree increases.

As explained above, in the specific example, the output element 5a continuously transitions, according to the dimming degree, a state in which the output element 5a continues the ON state and wobbles without changing to the OFF state and a state in which the output element 5a performs the switching operation repeating the ON state and the OFF state and oscillates. As a result, the amplitude of the oscillating current I5 continuously changes according to the dimming degree. The output current IOUT continuously changes according to the dimming degree.

Figure 11:
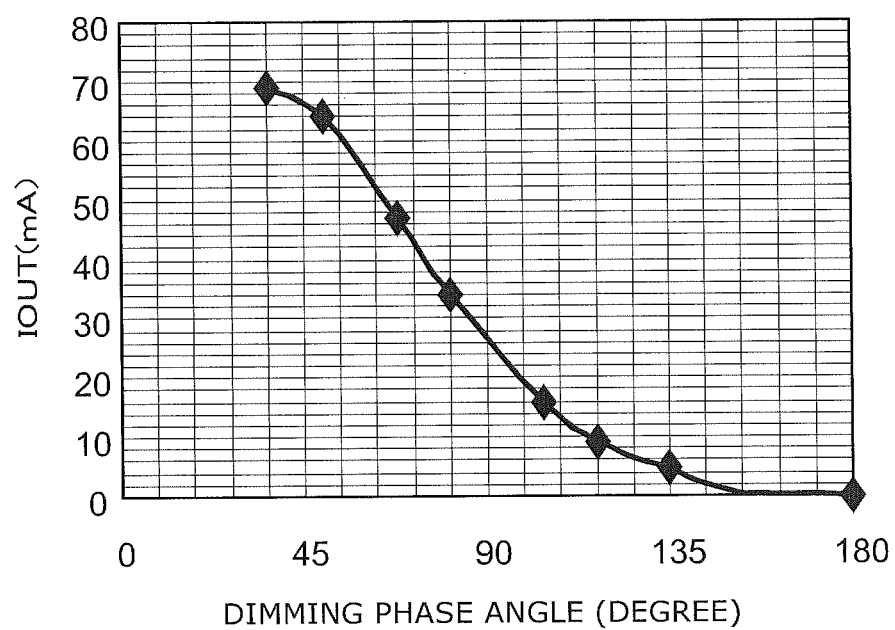
FIG. 11 is a characteristic chart for explaining a relation between a dimming phase angle and an output current IOUT.

FIG. 11 is a characteristic chart for explaining a relation between the dimming phase angle and the output current IOUT.

As shown in FIG. 11, in the specific example, the output current IOUT can be continuously controlled to zero according to the dimming phase angle (the dimming degree).

In this way, in the embodiment, a state of the output element continuously transitions according to the dimming degree of the dimmer. As a result, it is possible to continuously change an output current and expand a variable range of the dimming degree of the dimmer. Further, it is possible to continuously dim the luminaire and expand a dimming range.

Sixth Embodiment

Figure 12:
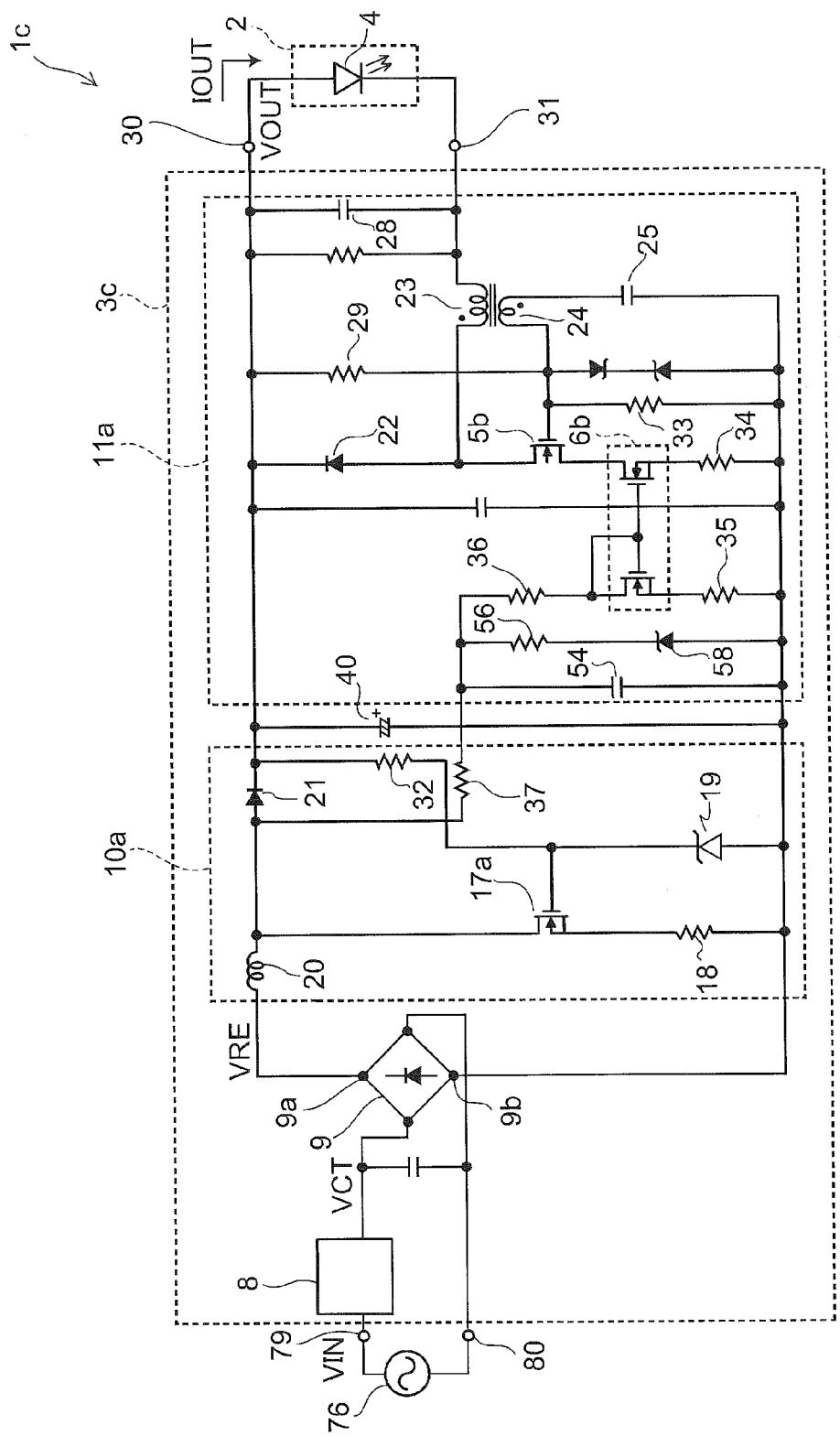
FIG. 12 is a circuit diagram of a luminaire including a power supply for lighting according to a sixth embodiment.

FIG. 12 is a circuit diagram of a luminaire including a power supply for lighting according to a sixth embodiment.

As shown in FIG. 12, the sixth embodiment is different from the fifth embodiment in the configurations of the constant current circuit 10 and the DC-DC converter 11. Specifically, a power supply for lighting 3c includes the dimmer 8, the rectifying circuit 9, a constant current circuit 10a, and a DC-DC converter 11a. The dimmer 8 and the rectifying circuit 9 are the same as the dimmer 8 and the rectifying circuit 9 in the fifth embodiment. A luminaire 1c includes the lighting load 2 and the power supply for lighting 3c. The lighting load 2 is the same as the lighting load 2 in the first embodiment.

The constant current circuit 10a is different from the constant current circuit 10 in the second embodiment in that the transistor 17 is an element of a normally-off type and in the configuration of a bias circuit for feeding a constant current. Specifically, the constant current circuit 10a includes a transistor 17a, resistors 18 and 32 and the Zener diode 19 that bias the transistor 17a, the choke coil 20, and the diode 21.

The transistor 17a is, for example, an FET and is an element, of the normally-off type. A drain of the transistor 17a is connected to the high-potential terminal 9a of the rectifying circuit 9 via the choke coil 20. A source of the transistor 17a is connected to the low-potential terminal 9b of the rectifying circuit 9 via the resistor 18. A gate of the transistor 17a is connected to the cathode of the diode 21 via the bias resistor 32 and connected to the low-potential terminal 9b of the rectifying circuit 9 via the Zener diode 19. The high-potential terminal 9a of the rectifying circuit 9 is connected to the anode of the diode 21. The cathode of the diode 21 is connected to the DC-DC converter 11a. The smoothing capacitor 40 is connected between the cathode of the diode 21 and the low-potential terminal 9b of the rectifying circuit 9.

The transistor 17a is biased by the bias resistor 32 and the Zener diode 19. The transistor 17a feeds a constant current for causing the phase circuit 13 of the dimmer 8 to operate. Therefore, as in the constant current circuit 10, in the constant current circuit 10a, an element having small impedance compared with the phase circuit 13 is connected as a load of the rectifying circuit 9. Consequently, the constant current circuit 10a can suppress the influence of input impedance of the DC-DC converter 11 at a post stage and cause the dimmer 8 to stably operate.

The DC-DC converter 11a is different from the DC-DC converter 11 in the second embodiment in that both the output element 5a and the constant current element 6a are elements of the normally-off type and, as a result, different in configuration such as the positions of the inductor 23 and the like.

The DC-DC converter 11a includes an output element 5b, a constant current element 6b, the rectifying element 22, the inductor 23, the feedback winding (the first driving circuit) 24 that drives the output element 5b, the coupling capacitor 25, the output capacitor 28, the bias resistor 29, and resistors 33 to 37.

The output element 5b and the constant current element 6b are, for example, field effect transistors (FETs) and, for example, high electron mobility transistors (HEMTs).

A drain of the output element 5b is connected to the cathode of the diode 21 of the constant current circuit 10a via the rectifying element 22 in the opposite direction. A source of the output element 5b is connected to the constant current element 6b. A gate of the output element 5b is connected to one end of the feedback winding 24. The other end of the feedback winding 24 is connected to the low-potential terminal 9b of the rectifying circuit 9 via the coupling capacitor 25.

The bias resistor 29 is connected between the cathode of the diode 21 and the gate of the output element 5b. The resistor 33 is connected between the gate of the output element 5b and the low-potential terminal 9b of the rectifying circuit 9. A protection diode is connected to the gate of the output element 5b.

The constant current element 6b includes a current mirror. A drain of an output side transistor is connected to the source of the output element 5b. A source of the output side transistor is connected to the low-potential terminal 9b of the rectifying circuit 9 via the resistor 34. A gate of the output side transistor is connected to a gate and a drain of a reference side transistor. A source of the reference side transistor is connected to the low-potential terminal 9b of the rectifying circuit 9 via the resistor 35. The drain and the gate of the reference side transistor are connected to the anode of the diode 21 via the resistors 36 and 37. The resistor 37 is connected to the low-potential terminal 9b of the rectifying circuit 9 via the capacitor 54. The resistor 37 and the capacitor 54 configure a low-pass filter or an integration circuit. The Zener diode 58 is connected in parallel to the capacitor 54 via the resistor 56.

An electric current that changes according to the dimming degree is fed to the reference side transistor of the constant current element 6b via the resistor 36. Therefore, the electric current that changes according to the dimming degree flows to the output side transistor of the constant current element 6b.

The inductor 23 is connected between the drain of the output element 5b and the low-potential output terminal 31. The inductor 23 and the feedback winding 24 are magnetically coupled in polarity in which a positive voltage is supplied to the gate of the output element 5b if an increasing electric current flows from one end to the other end of the inductor 23.

The output capacitor 28 is connected between the high-potential output terminal 30 and the low-potential output terminal 31. The high-potential output terminal 30 is connected to the cathode of the diode 21 of the constant current circuit 10a.

The lighting load 2 is connected in parallel to the output capacitor 28 between the high-potential output terminal 30 and the low-potential output terminal 31.

The operation of the DC-DC converter 11a is the same as the operation of the DC-DC converter 11 except that the output element 5a and the constant current element 6a are moved to the low-potential side and the rectifying element 22, the output capacitor 28, and the lighting load 2 are moved to the high-potential side and that the output element 5a and the constant current element 6a are changed to the elements of the normally-off type.

Therefore, in the embodiment, according to the dimming degree of the dimmer, the output element of the normally-off type performs a switching operation repeating an ON state and an OFF state and oscillates or outputs the output current while continuing the ON state. In other words, like the output element in the third embodiment, an operation state continuously transitions according to the dimming degree of the dimmer. As a result, it is possible to obtain effects same as the effects in the third embodiment.

Seventh Embodiment

Figure 13:
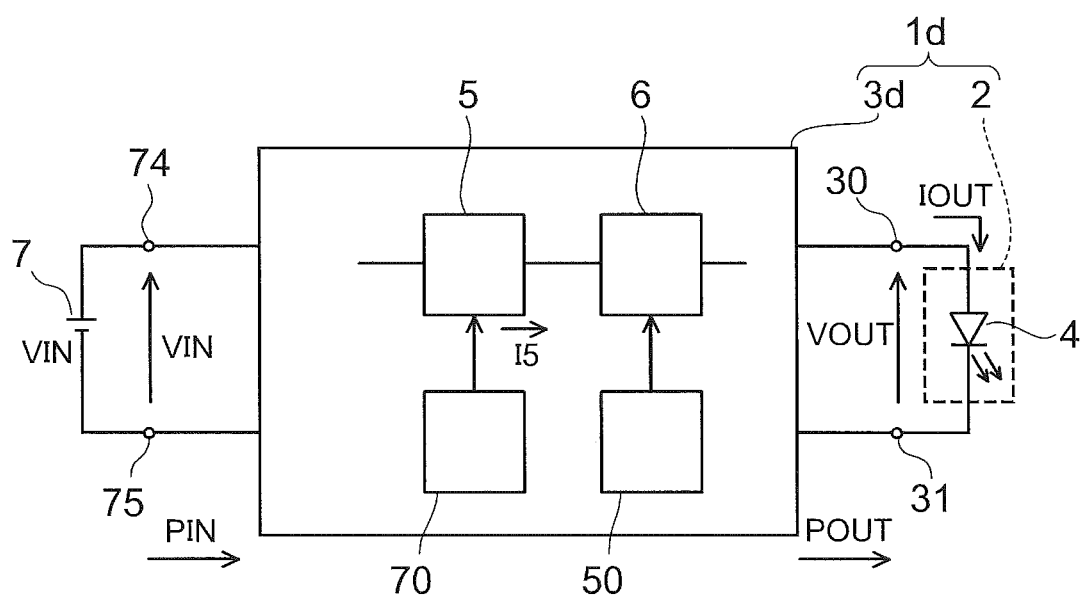
FIG. 13 is a block diagram of a luminaire including a power supply for lighting according to a seventh embodiment.

FIG. 13 is a block diagram of a luminaire including a power supply for lighting according to a seventh embodiment.

As shown in FIG. 13, a luminaire 1d includes the lighting load 2 and a power supply for lighting 3d that supplies electric power to the lighting load 2. The luminaire 1ei including the power supply for lighting 3d according to the seventh embodiment is different from the luminaire 1d according to the third embodiment in the configuration of the power supply for lighting 3. The lighting load 2 is the same as the lighting load 2 in the third embodiment.

In the power supply for lighting 3d, a light turn-off circuit 50 is added to the power supply for lighting 3 in the third embodiment. Specifically, the power supply for lighting 3d includes the output element 5, the constant current element 6 that is connected in series to the output element 5 and limits an electric current flowing through the output element 5, the light turn-off circuit 50 that controls the constant current element 6 to turn off light, and the first driving circuit 70 that drives the output element 5. The output element 5, the constant current element 6, and the first driving circuit 70 are the same as the output element 5, the constant current element 6, and the first driving circuit 70 in the third embodiment.

The light turn-off circuit 50 is connected between the power supply 7 and the lighting load 2. The light turn-off circuit 50 turns off the constant current, element 6 if a predetermined amount is equal to or smaller than a specified value. As a result, the electric current flowing through the output element 5 is interrupted, the operation of the power supply for lighting 3 stops, and the lighting load 2 is turned off. The specified value is a value of the predetermined amount when the lighting load 2 is turned off.

For example, the specified value when the predetermined amount is the power difference ΔP is the power consumption of the power supply for lighting 3 when the lighting load 2 is turned off. The specified value when the predetermined amount is the input power PIN is the input power PIN when the lighting load 2 is turned off. The specified value when the predetermine amount is the output power POUT is the output power POUT when the lighting load 2 is turned off and is zero or a positive value.

For example, if the predetermined amount is the potential difference ΔV, the specified value is a potential difference when the lighting load 2 is turned off and can be set to, for example, zero or a positive value. The specified value when the predetermined amount is the power supply voltage VIN or the output voltage VOUT is respectively a value of the power supply voltage VIN or the output voltage VOUT when the lighting load 2 is turned off.

The specified value when the predetermined amount is the current difference ΔI is a consumed current of the power supply for lighting 3 while the lighting load 2 is off. The specified value when the predetermined amount is the output current IOUT is a value of the output current IOUT when the lighting load 2 is turned off and is zero or a positive value.

The operation of the output element 5 is the same as the operation in the third embodiment explained with reference to FIGS. 3A to 3D. If the predetermined amount increases, the output element 5 changes to, for example, a state in which the output element 5 is imperfectly oscillating. The electric current of the output element 5 wobbles. However, if the predetermined amount is smaller than a predetermined value, the output element 5 does not change to an OFF state and continues an ON state. A peak value of the wobbling electric current of the output element 5 is a value limited by a constant, current value of the constant current element 6. The oscillation period T of the output element 5 changes according to a variation range of the electric current.

If the predetermined amount is equal to or larger than the predetermined value, the output element 5 performs a switching operation repeating the ON state and the OFF state and oscillates. At this point, the power supply for lighting 3 operates as a switching power supply.

As explained above, the switching power supply performs the switching operation repeating the ON state in which the resistance of the output element 5 is low and the OFF state in which an electric current does not flow. Therefore, the switching power supply is a low-power consumption and high-efficiency power supply. In the embodiment, the switching power supply performs the switching operation if the predetermined amount is larger than the predetermined value and performs an operation like the operation of a series regulator if the predetermined amount is small. If the predetermined amount is large, a product of a potential difference between both ends of the output element 5 and an electric current is large. If the switching power supply performs the operation of the series regulator, a loss increases. Therefore, if the predetermined amount is large, it is suitable for a reduction in power consumption to perform the switching operation. If the predetermined amount, is small, since the loss is small, there is no problem in operating as the series regulator.

In the embodiment, as in the embodiments explained above, if the predetermined amount is smaller than the predetermined value, the electric current wobbles while the output element 5 continues the ON state without changing to the OFF state. The output element 5 turns on the lighting load 2 with an average of the electric current (FIGS. 3B and 3C). If the predetermined amount, is smaller, the output element 5 outputs a direct current to the lighting load 2 and turns on the lighting load 2 while continuing the ON state (FIG. 3A). As a result, in the embodiment, as in the embodiments explained above, it is possible to continuously change the output current to zero. Further, it is possible to smoothly turn off the lighting load 2 in the luminaire 1d.

Therefore, in the embodiment, as in the embodiments explained above, it is possible to continuously change, according to the predetermined amount, the output current IOUT from a maximum during the switching operation of the output element 5 to a minimum in outputting a direct current while continuing the ON state of the output element 5. Further, it is possible to continuously dim the lighting load 2 in the luminaire 1d in a range of 0 to 100%.

In the embodiment, the constant current element 6 is turned off if the predetermined amount is equal to or smaller than the specified value. Therefore, it is possible to stably reduce the output current to zero without being affected by the variation in the power supply voltage VIN. Further, it is possible to stably turn off the lighting load 2 in the luminaire 1d without being affected by the variation in the power supply voltage VIN.

In the embodiment, as in the embodiments explained above, the output element 5 may perform the switching operation repeating the ON state and the OFF state if the predetermined amount is equal to or larger than the predetermined value and oscillate (FIG. 3D) and perform an operation continuing the ON state and outputting a direct current if the predetermined amount is smaller than the predetermined value (FIG. 3A). In other words, the output element 5 does not have to perform the operation in which an electric current wobbles while the output element 5 continues the ON state without changing to the OFF state (FIGS. 3B and 3C).

As explained above, in the embodiment, the output element oscillates and outputs an oscillating electric current if the predetermined amount is relatively large and stops the oscillation and outputs a direct current if the predetermined amount is relatively small. As a result, it is possible to expand a variable range of the output current. Further, it is possible to expand a dimming range of the luminaire. The constant current element is turned off if the predetermined amount is equal to or smaller than the specified value. Therefore, it is possible to stably reduce the output current to zero without being affected by, for example, variation in the power supply voltage. Further, it is possible to stably turn off the lighting load 2.

Eighth Embodiment

Figure 14:
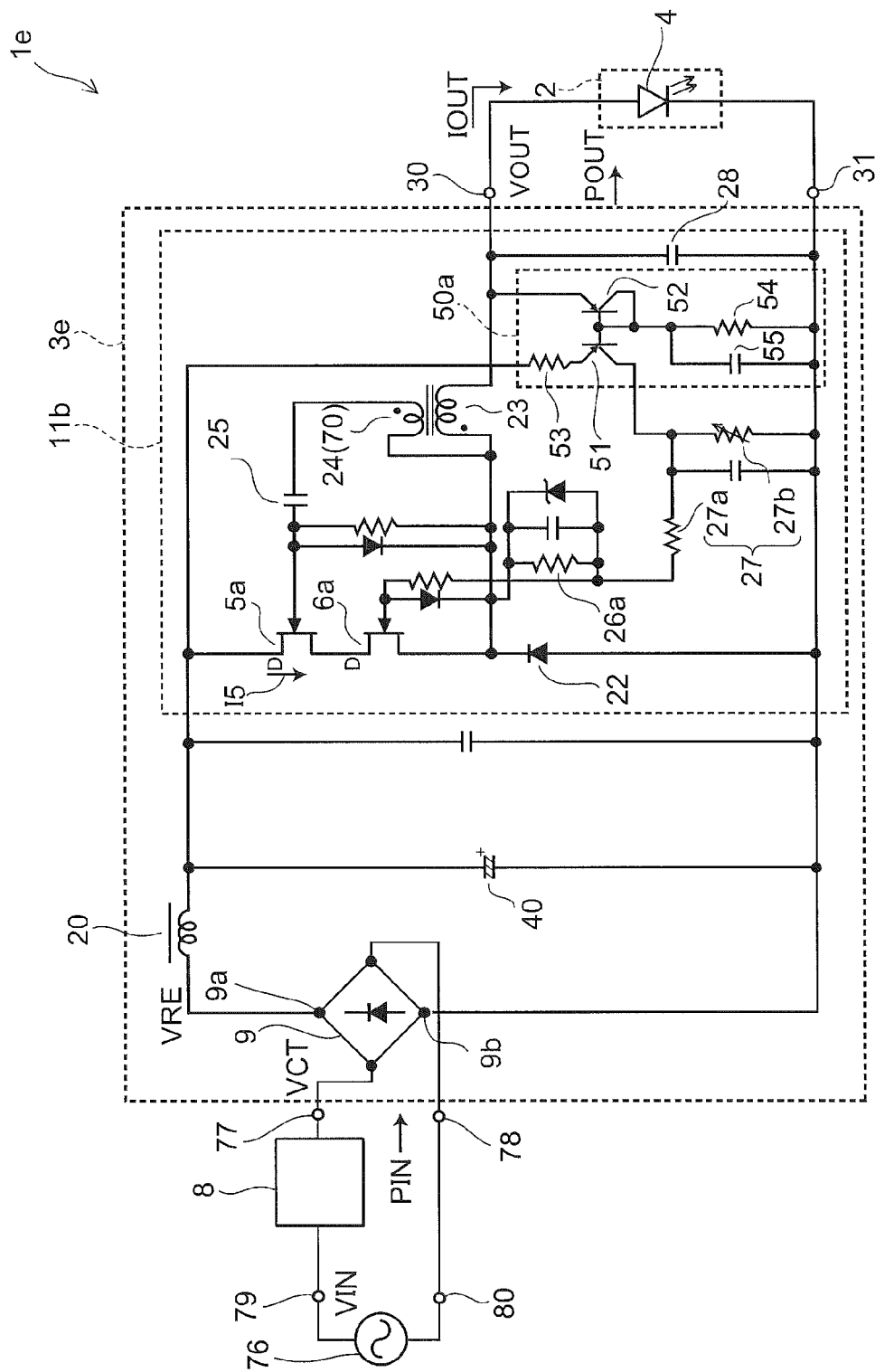
FIG. 14 is a circuit diagram of a luminaire including a power supply for lighting according to an eighth embodiment.

FIG. 14 is a circuit diagram of a luminaire including a power supply for lighting according to an eighth embodiment.

As shown in FIG. 14, the eighth embodiment is different from the seventh embodiment in that the rectifying circuit 9, the choice coil 20, and the smoothing capacitor 40 is added to the power supply for lighting 3 and the configuration of a DC-DC converter 11b including the output element 5a, the constant current element 6a, and a light turn-off circuit 50a is illustrated.

A luminaire 1e includes the lighting load 2, a power supply for lighting 3e, and the dimmer 8. The lighting load 2 is the same as the lighting load 2 in the first embodiment.

The dimmer 8 is connected, to the alternating-current power supply 76 and inserted into, in series, one of a pair of power supply lines for supplying the power supply voltage VIN. In this way, the dimmer 8 may be inserted, in series, the pair of power supply lines for supplying the power supply voltage VIN. Specifically, the dimmer 8 is inserted between one end 79 of the alternating-current power supply 76 and one input terminal 77 of the power supply for lighting 3a. The other end 80 of the alternating-current power supply 76 is connected to the other input terminal 78 of the power supply for lighting 3a. The dimmer 8 is the same as the dimmer 8 in the power supply 7 in the first embodiment.

The rectifying circuit 9 receives the alternating-current power supply voltage VIN via the dimmer 8 and outputs the direct-current voltage VRE. The rectifying circuit 9 includes a diode bridge. The rectifying circuit 9 outputs the direct-current voltage VRE that changes according to the dimming degree by the dimmer 8. The rectifying circuit 9 only has to be capable of rectifying an alternating-current voltage input from the dimmer 8 and may have other configurations.

The smoothing capacitor 40 is connected between the high-potential terminal 9a and the low-potential terminal 9b of the rectifying circuit 9 via the choke coil 20.

The DC-DC converter 11b includes the output element 5a, the constant current element 6a, the rectifying element 22, the inductor 23, the feedback winding 24 (the first driving circuit 70) that drives the output element 5a, the coupling capacitor 25, dividing resistors 26a and 27, the output capacitor 28, and the light turn-off circuit 50a.

The output element 5a and the constant current element 6a are, for example, field effect transistors (FETs), for example, high electron mobility transistors (HEMTs), and elements of the normally-on type.

The drain of the output element 5a is connected to a high-potential terminal of the smoothing capacitor 40 and connected, to the high-potential terminal 9a of the rectifying circuit 9 via the choke coil 20. The source of the output element 5a is connected to the drain of the constant current element 6a. The gate of the output element 5a (a control terminal of the output element) is connected to one end of the feedback winding 24 via the coupling capacitor 25.

The source of the constant current element 6a is connected to one end of the inductor 23 and the other end of the feedback winding 24. A voltage obtained by dividing source potential of the constant current element 6a with the dividing resistors 26a and 27 is input to the gate of the constant current element 6a (a control terminal of the constant current element). The dividing resistor 27 includes a resistor 27a and a variable resistor 27b connected in series.

The inductor 23 and the feedback winding 24 are magnetically coupled in polarity in which a positive voltage is supplied to the gate of the output element 5a if an increasing electric current flows from one end to the other end of the inductor 23.

Protection diodes are respectively connected to the gate of the output element 5a and the gate of the constant current element 6a. A bias resistor for startup may be connected between the drain of the output element 5a and the source of the constant current element 6a.

The rectifying element 22 is connected between the source of the constant current element 6a and the low-potential terminal 9b of the rectifying circuit 9 with a forward direction set in the direction from the low-potential terminal 9b to the constant current element 6a.

The other end of the inductor 23 is connected to the high-potential output terminal 30. The low-potential terminal 9b of the rectifying circuit 9 is connected to the low-potential output terminal 31. The output capacitor 28 is connected between the high-potential output terminal 30 and the low-potential output terminal 31.

The light turn-off circuit 50a includes transistors 51 and 52, resistors 53 and 54, and a capacitor 55.

The transistors 51 and 52 are PNP transistors and set to have the same characteristics. An emitter of the transistor 51 is connected to the drain of the output element 5a via the resistor 53. A collector of the transistor 51 is connected to a connection point of the resistor 27a and the variable resistor 27b included in the dividing resistor 27. A base of the transistor 51 is connected to a base of the transistor 52. An emitter of the transistor 52 is connected to the high-potential output terminal 30. A collector of the transistor 52 is connected to the base of the transistor 52 and the base of the transistor 51 and is further connected to the low-potential output terminal 31 via the resistor 54 and the capacitor 55.

The transistors 51 and 52 configure a current switch that detects, as a predetermined amount, the potential difference ΔV between a direct-current voltage input to the DC-DC converter 11b and the output voltage VOUT and conducts or interrupts a path of an electric current flowing through the resistor 27b via the resistor 53. If an emitter voltage of the transistor 51 is higher than an emitter voltage of the transistor 52, the transistor 51 is turned on and an electric current flows to the resistor 27b via the resistor 53. If the emitter voltage of the transistor 51 is equal to or lower than the emitter voltage of the transistor 52, the transistor 51 is turned off and the electric current flowing through the resistor 27b via the resistor 53 is interrupted. The resistances of the dividing resistors 26a and 27 (27a and 27b) are respectively set such that the constant current element 6a is turned off if the potential difference ΔV, which is the predetermined amount, is equal to or smaller than a specified value and the current element 6a is turned, on if the potential difference ΔV is larger than the specified value in a state in which the transistor 51 is turned on and an electric current flows to the resistor 27b. The specified value can be adjusted by changing the resistance of the variable resistor 27b.

The lighting load 2 is connected in parallel to the output capacitor 28 between the high-potential output terminal 30 and the low-potential output terminal 31.

The operation of the power supply for lighting 3e is explained. Since the dimmer 8 and the rectifying circuit 9 are already explained, the operation of the DC-DC converter 11b is mainly explained.

First, in the following explanation, the dimming degree of the dimmer 8 is set to nearly 100% and an input alternating-current voltage is substantially directly transmitted. In other words, a highest direct-current voltage is input to the DC-DC converter 11b.

If the power-supply voltage VIN is supplied to the power supply for lighting 3a, since the output element 5a is the element of the normally-on type, the output element 5a is on. Since the output capacitor 28 discharges, the output voltage VOUT is zero. Since a base voltage of the transistor 51 is zero, the transistor 51 is turned on and an electric current flows in the course of the resistor 53, the transistor 51, and the variable resistor 27b. As a result, since the voltage across both ends of the variable resistor 27b rises, the gate potential of the constant current element 6a is relatively high and the constant current element 6a is on.

The electric current flows in the course of the output element 5a, the constant current element 6a, the inductor 23, and the output capacitor 28. The output capacitor 28 is charged. The voltage across both ends of the output capacitor 28, i.e., the voltage between the high-potential output terminal 30 and the low-potential output terminal 31 is supplied to the illumination light source 4 of the lighting load 2 as the output voltage VOUT of the power supply for lighting 3a. Since the output element 5a and the constant current element 6a are on, an inverse voltage is applied to the rectifying element 22. An electric current does not flow to the rectifying element 22.

If the output voltage VOUT reaches a predetermined voltage, the output current IOUT flows to the illumination light source 4. The illumination light source 4 is turned on. At this point, an electric current flows in the course of the output element 5a, the constant current element 6a, the inductor 23, the output capacitor 28, and the illumination light source 4. For example, if the illumination light source 4 is an LED, the predetermined voltage is a forward direction voltage of the LED and is determined according to the illumination light source 4. If the illumination light source 4 is turned off, the output current IOUT does not flow. Therefore, the output capacitor 28 keeps the value of the output voltage VOUT.

The transistor 52 is turned, on according to the rise of the output voltage VOUT. A direct-current voltage input to the DC-DC converter 11b is sufficiently high compared with the output voltage VOUT, i.e., the potential difference (the predetermined amount) ΔV between the input and the output is sufficiently large. Therefore, an electric current flows in the course of the resistor 53, the transistor 51, and the variable resistor 27b. The electric current flows through the resistor 53 such that the emitter voltage of the transistor 51 is substantially equal to the emitter voltage of the transistor 52. As a result, the constant current element 6a maintains an ON state. Therefore, if the potential difference ΔV between the input and the output of the DC-DC converter 11b is large, the light turn-off circuit 50a controls the constant current element 6a to the ON state.

Since the potential difference ΔV between the input and the output of the DC-DC converter 11b is sufficiently large, the electric current flowing through the inductor 23 increases. Since the feedback winding 24 is magnetically coupled to the inductor 23, an electromotive force having polarity for setting the coupling capacitor 25 side to high potential is induced in the feedback winding 24. Therefore, potential that is positive with respect to the source of the output element 5a is supplied to the gate of the output element 5a via the coupling capacitor 25. The output element 5a maintains the ON state.

If the electric current flowing through the constant current element 6a including the FET exceeds an upper limit, a drain-to-source voltage of the constant current element 6a suddenly rises. Therefore, a gate-to-source voltage of the output element 5a falls below a threshold voltage and the output element 5a is turned off. The upper limit is a saturated current value of the constant current element 6a and is specified by potential input from the dividing resistors 26 and 27 to the gate of the constant current element 6a. As explained above, since the gate potential of the constant current element 6a is negative with respect to the source, it is possible to limit the saturated current, value to a proper value.

The inductor 23 continues to feed the electric current, in the course of the rectifying element 22, the output capacitor 28 and the lighting load 2, and the inductor 23. At this point, since the inductor 23 emits energy, the electric current of the inductor 23 decreases. Therefore, an electromotive force having polarity for setting the coupling capacitor 25 side to low potential is induced in the feedback winding 24. Potential that is negative with respect to the source of the output element 5a is supplied to the gate of the output element 5a via the coupling capacitor 25. The output element 5a maintains an OFF state.

If the energy accumulated in the inductor 23 decreases to zero, the electric current flowing through the inductor 23 decreases to zero. The direction of the electromotive force induced in the feedback winding 24 is inverted again. An electromotive force for setting the coupling capacitor 25 side to high potential is induced. Consequently, potential higher than the potential of the source is supplied to the gate of the output element 5a. The output element 5a is turned on. Consequently, the output voltage VOUT returns to the state in which the output voltage VOUT reaches the predetermined voltage.

Thereafter, the operation explained, above is repeated. Consequently, the switching to ON and OFF of the output element 5a is automatically repeated. The output voltage VOUT obtained by dropping the power supply voltage VIN is supplied to the illumination light source 4. At this point, the output element 5a is performing a switching operation repeating the ON state and the OFF state (FIG. 3D). An electric current supplied to the illumination light source 4 is a constant current with an upper limit limited by the constant current element 6a. Therefore, it is possible to stably light the illumination light source 4.

If the dimming degree of the dimmer 8 is set to a value smaller than 100% and an input alternating-current voltage is phase-controlled and transmitted, i.e., if a high direct-current voltage is input to the DC-DC converter 11b, the above explanation applies if the output element 5a can continue the oscillation and the transistor 51 in the light turn-off circuit 50a is on. A value of the direct-current voltage input to the DC-DC converter 11b changes according to the dimming degree of the dimmer 8. An average of the output current IOUT can be controlled. Therefore, it is possible to dim the illumination light source 4 of the lighting load 2 according to the dimming degree.

Since the transistor 51 in the light turn-on circuit 50a is on, the voltage across both ends of the resistor 27b changes according to the value of the direct-current voltage input to the DC-DC converter 11b. Therefore, it is possible to control a constant current value of the constant current element 6a according to the direct-current voltage input to the DC-DC converter 11b.

If the dimming degree of the dimmer 8 is set to a smaller value while the transistor 51 in the light turn-off circuit 50a maintains the ON state, i.e., if the direct-current voltage input to the DC-DC converter 11b is lower, since a potential difference between both ends of the inductor 23 is small even if the output element 5a is turned on, the electric current flowing through the inductor 23 may not be able to increase. Therefore, the output element 5a does not change to the OFF state and outputs a constant direct current. In this case, the output element 5a is performing the ON continuation operation continuing the ON state (FIG. 3A).

If the dimming degree of the dimmer 8 is set to a smaller value and the potential difference ΔV between the direct-current voltage VOUT input to the DC-DC converter 11b and the output voltage VOUT is lower than the specified value, the constant current element 6a is turned off. As a result, the DC-DC converter 11b stops the operation. The lighting load 2 is turned off.

As explained above, in the embodiment, according to the dimming degree of the dimmer, the output element of the normally-on type performs the switching operation repeating the ON state and the OFF state and oscillates or continues the ON state and outputs the direct current. As a result, it is possible to continuously change an output current from a maximum to zero. Further, it is possible to smoothly turn off the lighting load in the luminaire.

In the embodiment, the light turn-off circuit 50a operates according to the predetermined amount, which is the potential difference ΔV between the direct-current voltage input to the DC-DC converter 11b and the output voltage VOUT. If the predetermined amount is equal to or smaller than the specified value, in order to turn off the constant current element 6a, the power supply for lighting 3a including the DC-DC converter 11b stops the operation and the light turn-off circuit 50a turns off the lighting load 2. The direct-current voltage input to the DC-DC converter 11b can be set to turn off the lighting load 2 from a state in which the direct-current voltage is sufficiently large for turning on the lighting load 2. As a result, it is possible to prevent a situation in which a peak value of a phase-controlled alternating-current voltage VCT changes because of variation in the dimmer 8 or the power supply voltage VIN and a turned-off state of the lighting load 2 becomes unstable.

For example, if the dimming degree of the dimmer 8 is reduced to turn off the lighting load 2 or if it is determined whether the lighting load 2 is in a turned-on state or in a turned-off state according to only a relation between the power supply voltage VIN and the output voltage VOUT, the turned-off state of the lighting load 2 sometimes becomes unstable because of the variation in the dimmer 8 or the power supply voltage VIN. As a result, the lighting load 2 is turned on again or irregularly repeats the turned-on state and the turned-off state.

For example, it is also possible to suppress, for example, flickering or the repetition of the turned-on state and the turned-off state due the variation in the dimmer 8 or the power supply voltage VIN by, for example, changing, through control, a state in which the direct-current, voltage input to the DC-DC converter 11b can stably turn on the lighting load 2 to the turn-off state. However, this causes complication of a circuit configuration and an increase in a circuit size.

On the other hand, in the embodiment, the light turn-off circuit 50a turns off the constant current element if the predetermined amount is equal to or smaller than the specified value. Therefore, it is possible to stably turn off the lighting load 2 with a simple configuration.

The embodiments are explained above with reference to the specific examples. However, the present invention is not limited to the embodiments. Various modifications are possible.

For example, the output elements 5 and 5a and the constant current elements 6 and 6a are not limited to a GaN HEMT. The output elements 5 and 5a and the constant current elements 6 and 6a may be, for example, a semiconductor element formed on a semiconductor substrate using a semiconductor having a wide bandgap (a wide bandgap semiconductor) such as silicon carbide (SiC), gallium nitride (GaN) or diamond. The wide bandgap semiconductor refers to a semiconductor having a bandgap wider than a bandgap of about 1.4 eV of gallium arsenide. Examples of the wide bandgap semiconductor include a semiconductor having a bandgap equal to or larger than 1.5 eV, gallium phosphide (GaP, a bandgap is about 2.3 eV), gallium nitride (GaN, a bandgap is about 3.4 eV), diamond (C, a bandgap is about 5.27 eV), aluminum nitride (AlN, a bandgap is about 5.9 eV), and silicon carbide (SiC). Such a wide bandgap semiconductor element has small parasitic capacitance and can perform a high-speed operation because the wide bandgap semiconductor element can be formed smaller than a silicon semiconductor element if a withstanding voltage is set equal. Therefore, it is possible to reduce a switching period, and reduce the sizes of winding components, capacitors, and the like.

The illumination light source 4 is not limited, to the LED and may be an EL, an OLED, or the like. A plurality of the illumination light sources 4 may be connected to the lighting load 2 in series or in parallel.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply for lighting comprising:
   an output element connected between a power source and a lighting load and configured to be switched to a switching operation repeating an ON state and an OFF state and an ON continuation operation continuing the ON state;
   a constant current element connected in series with the output element and configured to limit an electric current flowing to the output element; and
   a control circuit configured to control a constant current value of the constant current element by controlling the constant current element.

2. The power supply for lighting according to claim 1, wherein the output element performs the switching operation if a predetermined amount, which is at least any one of a power difference, a potential difference, and a current difference between the power source and the lighting load, is relatively large and performs the ON continuation operation if the predetermined amount is relatively small.

3. The power supply for lighting according to claim 2, wherein the electric current flowing to the output element wobbles such that a variation range increases if the potential difference between the power source and the lighting load increases.

4. The power supply for lighting according to claim 2, wherein the output element continues the ON state and outputs a direct current if the potential difference between the power source and the lighting load is relatively small.

5. The power supply for lighting according to claim 2, further comprising a phase control circuit configured to control timing for conducting an alternating-current voltage.

6. The power supply for lighting according to claim 2, further comprising a light turn-off circuit connected between the power source and the lighting load and configured to turn off the constant current element if the predetermined amount is smaller than a specified value.

7. The power supply for lighting according to claim 6, wherein the predetermined value is at least any one of a power difference, a potential difference, and a current difference between the power source and the lighting load when the lighting load is subjected to constant current control.

8. The power supply for lighting according to claim 6, wherein the electric current flowing to the output element wobbles such that a variation range increases if the predetermined amount increases.

9. The power supply for lighting according to claim 6, wherein the output element continues the ON state and outputs a direct current if the predetermined amount is relatively small.

10. The power supply for lighting according to claim 6, wherein the predetermined amount is a power difference between the power source and the lighting load.

11. The power supply for lighting according to claim 6, wherein the predetermined amount is a potential difference between the power source and the lighting load.

12. The power supply for lighting according to claim 6, further comprising a phase control circuit configured to control timing for conducting an alternating-current voltage.

13. The power supply for lighting according to claim 1, wherein the output element is an element of a normally-on type.

14. The power supply for lighting according to claim 1, wherein the output element is an element of a normally-off type supplied with an output voltage and biased to the ON state.

15. The power supply for lighting according to claim 1, wherein the control circuit is configured to switch the output element to the switching operation or the ON continuation operation on the basis of a control signal for controlling an output to the lighting load.

16. The power supply for lighting according to claim 15, wherein the control circuit switches the output element to the switching operation if the output to the lighting load is relatively large and switches the output element to the ON continuation operation if the output to the lighting load is relatively small.

17. The power supply for lighting according to claim 15, wherein the output element is an element of a normally-on type.

18. The power supply for lighting according to claim 1, wherein:
- the control circuit switching the output element to the ON continuation operation if the output to the lighting load is equal to or smaller than a first output,
- the control circuit switching the output element to the switching operation if the output to the lighting load is equal to or larger than a second output larger than the first output, and
- the control circuit switching the output element to the ON continuation operation during a first period and switching the output element to the switching operation during a second period if the output to the lighting load is larger than the first output and smaller than the second output.

19. A power supply for lighting comprising:
- an output element connected between a power source and a lighting load and configured to be switched to a switching operation repeating an ON state and an OFF state and an ON continuation operation continuing the ON state; and
- a control circuit configured to switch the output element to the switching operation or the ON continuation operation on the basis of a control signal for controlling an output to the lighting load,
- wherein the control circuit switches the output element to the ON continuation operation if the output to the lighting load is equal to or smaller than a first output,
- wherein the control circuit switches the output element to the switching operation if the output to the lighting load is equal to or larger than a second output larger than the first output, and
- wherein the control circuit switches the output element to the ON continuation operation during a first period and switches the output element to the switching operation during a second period if the output to the lighting load is larger than the first output and smaller than the second output.

20. A luminaire comprising:
- a lighting load; and
- a power supply for lighting configured to supply electric power to the lighting load, the power supply for lighting including:
  - an output element connected between a power source and the lighting load and configured to be switched to a switching operation repeating an ON state and an OFF state and an ON continuation operation continuing the ON state;
  - a constant current element connected in series with the output element and configured to limit an electric current flowing to the output element; and
  - a control circuit configured to control a constant current value of the constant current element by controlling the constant current element.

* * * * *